United States Patent
Koch et al.

(10) Patent No.: US 11,157,762 B2
(45) Date of Patent: Oct. 26, 2021

(54) SURROGATE METADATA AGGREGATION FOR DYNAMIC CONTENT ASSEMBLY

(71) Applicant: AT&T Intellectual Property I, L.P., Atlanta, GA (US)

(72) Inventors: Robert Alan Koch, Norcross, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

(21) Appl. No.: 16/444,123

(22) Filed: Jun. 18, 2019

(65) Prior Publication Data

US 2020/0401836 A1    Dec. 24, 2020

(51) Int. Cl.
*G06F 16/587*    (2019.01)
*G06K 9/46*    (2006.01)
*G06F 16/58*    (2019.01)
*G06F 16/583*    (2019.01)

(52) U.S. Cl.
CPC ............ *G06K 9/46* (2013.01); *G06F 16/587* (2019.01); *G06F 16/5854* (2019.01); *G06F 16/5866* (2019.01)

(58) Field of Classification Search
CPC ..... G06K 9/46; G06F 16/587; G06F 16/5866; G06F 16/5854
USPC ........ 382/190, 276, 305; 707/201, 613, 705, 707/736, 737, 740, 912, 918, 955, 953; 719/328
See application file for complete search history.

(56) References Cited

U.S. PATENT DOCUMENTS

| 6,175,343 B1 | 1/2001 | Mitchell et al. |
| 9,179,078 B2 | 11/2015 | Samadani et al. |
| 9,304,585 B2 | 4/2016 | Fujii et al. |

(Continued)

FOREIGN PATENT DOCUMENTS

| KR | 20130049220 KR | 5/2013 |
| WO | WO 2012/174865 | 12/2012 |

(Continued)

OTHER PUBLICATIONS

US 1,004,323 A1, 08/2018, Bean et al. (withdrawn)

(Continued)

*Primary Examiner* — Sheela C Chawan
(74) *Attorney, Agent, or Firm* — Hartman & Citrin LLC

(57) ABSTRACT

Concepts and technologies directed to surrogate metadata aggregation for dynamic content assembly are disclosed. Embodiments can include a system that comprises a processor and a memory that stores computer-executable instructions that configure a processor to perform operations. The operations can include obtaining a first visual content from a digital data store, where the first visual content is configured to digitally represent a first scene. The operations can include performing image recognition on the first visual content so as to identify a second visual content that is digitally configured to represent a second scene. The operations can include determining that native original metadata cannot be obtained for the first visual content, where the native original metadata includes information about the first scene digitally represented by the first visual content. The operation can include generating surrogate metadata for the first visual content based on metadata obtained from the second visual content.

17 Claims, 8 Drawing Sheets

(56) References Cited

U.S. PATENT DOCUMENTS

| | | | |
|---|---|---|---|
| 9,338,589 | B2 | 5/2016 | Loxam et al. |
| 9,465,129 | B1 | 10/2016 | Olsson et al. |
| 9,524,524 | B2 | 12/2016 | Calman et al. |
| 9,646,421 | B2 | 5/2017 | Ayers et al. |
| 9,648,297 | B1 | 5/2017 | Ettinger et al. |
| 9,760,778 | B1 * | 9/2017 | Wakim .............. G06K 9/00671 |
| 9,928,659 | B2 | 3/2018 | Dean et al. |
| 1,008,979 | A1 | 10/2018 | Byrne et al. |
| 1,012,773 | A1 | 11/2018 | Huddy |
| 2003/0009527 | A1 * | 1/2003 | McIntyre ............. H04N 1/0014 |
| | | | 709/206 |
| 2009/0248300 | A1 | 10/2009 | Dunko et al. |
| 2016/0140868 | A1 | 5/2016 | Lovett et al. |
| 2017/0270970 | A1 * | 9/2017 | Ho ...................... G06F 16/5854 |
| 2017/0357296 | A1 | 12/2017 | Jordan |
| 2018/0053351 | A1 | 2/2018 | Anderson |
| 2018/0150810 | A1 | 5/2018 | Lee et al. |
| 2018/0168781 | A1 | 6/2018 | Kopelman et al. |
| 2018/0204361 | A1 | 7/2018 | Tinsman |
| 2018/0300916 | A1 | 10/2018 | Barnett et al. |
| 2018/0373934 | A1 * | 12/2018 | Bridges .............. G06K 9/00671 |

FOREIGN PATENT DOCUMENTS

| | | |
|---|---|---|
| WO | WO 2016/071896 | 5/2016 |
| WO | WO 2016/198873 | 12/2016 |
| WO | WO 2017/105183 | 6/2017 |
| WO | WO 2018/106289 | 6/2018 |
| WO | WO 2018/140404 | 8/2018 |

OTHER PUBLICATIONS

Zgellner et a!., "Cultural Heritage Layers: Integrating Historic Media in Augmented Reality," Proceedings of the 1S!h International Conference on Virtual Systems and Multimedia, VSMM 2009, Sep. 9-12, 2009, pp. 193-196.*

Zoellner et al., "Cultural Heritage Layers: Integrating Historic Media in Augmented Reality," Proceedings of the 15$^{th}$ International Conference on Virtual Systems and Multimedia, VSMM 2009, Sep. 9-12, 2009, pp. 193-196.

Schall et al., "Handheld Augmented Reality for Underground Infrastructure Visualization," Personal and Ubiquitous Computing, May 2009, vol. 13, Issue 4, pp. 281-291.

Johnson et al., "The 2010 Horizon Report: Museum Edition," Curator: The Museum Journal, Jan. 10, 2011, vol. 54, Issue 1.

Guin, Jeffrey, "Augmented reality tactics for heritage interpretation," Voices of the Past, Aug. 27, 2018, http://voicesofthepast.org/2017/04/14/augmented-reality/.

Jonathan@farmlytics, "Augmented Reality," Jun. 16, 2018, https://web.archive.org/web/20181121181117/http://www.farmlytics.com/augmented-reality/.

* cited by examiner

SURROGATE METADATA AGGREGATION FOR DYNAMIC CONTENT ASSEMBLY

BACKGROUND

Historically, photos and motion pictures were produced using various chemical processes after an initial exposure on film. With the rise of digital photography, augmented reality, and virtual reality, the ability to digitally capture images and video has advanced, such as through the use of various user equipment (e.g., smart phones). Yet there remains a large number of historic visual content (e.g., photos and/or video) that were digitized using digitization platforms, such as a photo scanner or another capture device. In some instances, the historic visual content was stored on individual hard drives and/or otherwise within siloed memory devices. With the rise of computer networking, many users and entities have transferred data storage to a cloud storage platform (e.g., a remote data store that is accessible from one or more locations), and thus the historic visual content may be available to remote devices. However, the historic visual content may not have been uniformly converted to digital format, and thus may not be readily searchable by remote computing systems. As such, native metadata pertaining to the historic environment may not exist within the digital files of the historic visual content. This may effectively render a large portion of digital content unusable or otherwise unavailable for use by various platforms. Traditional attempts at searching for the historic visual content may be processor intensive, which in turn increases processing and access latency. As such, traditional attempts at using historic visual content may not address the technical challenges imposed by applications which may operate on low-latency protocols, such as augmented reality applications.

SUMMARY

The present disclosure is directed to surrogate metadata aggregation for dynamic content assembly, according to various embodiments. According to one aspect of the concepts and technologies disclosed herein, a system is disclosed, according to an embodiment. In some embodiments, the system can include or otherwise be provided by one or more instances of a network server or other computing system of a network. In some embodiments, the network server can include one or more of an aggregation server, an augmented reality content server, a network device, or the like. The system can be communicatively coupled to a network, a radio access network, data stores, various instances of network devices and/or user equipment. In some embodiments, the system can include a processor and a memory. The memory can store computer-executable instructions that, in response to execution by the processor, cause the processor to perform operations. In some embodiments, the operations can include obtaining archived digital content from a digital data store, where the archived digital content can digitally present a physical object within a historic environment. In some embodiments, the archived digital content can be stored in the digital data store by a digitization platform, where the digitization platform transforms an originally captured content depicting the historic environment into the archived digital content. In some embodiments, the digitization platform fails to generate metadata fields to store native original metadata in the archived digital content. The operations can also include performing image recognition on the archived digital content so as to correlate the archived digital content with digitally captured content that presents the physical object within a current environment.

The operations can also include determining that native original metadata cannot be obtained from the archived digital content, where the native original metadata is associated with information about the physical object as presented within the historic environment. In some embodiments, determining that native original metadata cannot be obtained from the archived digital content can include one or more operations. In some embodiments, the operations can include dereferencing the archived digital content to detect for the native original metadata, and determining that the dereferencing yields a null pointer exception, where the null pointer exception results from the archived digital content not having fields to store the native original metadata. In some embodiments, dereferencing the archived digital content includes detecting where native original metadata is stored or could be stored in the archived digital content. In some embodiments, the archived digital content may provide and/or indicate a null pointer due to the lack of native original metadata, where the null pointer can trigger or otherwise cause the null pointer exception.

In some embodiments, the operations can also include generating surrogate metadata for the archived digital content based on the digitally captured content. In some embodiments, generating the surrogate metadata can include one or more operations. The operations can include identifying tags within native metadata of the digitally captured content, determining which of the tags within the native metadata are marked as surrogate importable, and assembling the surrogate metadata based on the tags that are marked as surrogate importable.

In some embodiments, the operations can also include embedding, within the archived digital content, the surrogate metadata by instantiating distinct metadata fields corresponding to the historic environment, where the surrogate metadata is embedded without populating existing metadata fields provided by the archived digital content. In some embodiments, the operations can also include receiving a content transition request associated with the physical object, and identifying the digitally captured content and the archived digital content based on the surrogate metadata. In some embodiments, the operations can also include generating a content transition stream that presents the archived digital content within the current environment of the physical object, and providing the content transition stream to a requesting device.

According to another aspect of the concepts and technologies disclosed herein, a method is disclosed according to an embodiment. In various embodiments, the method can include obtaining, by a network server executing a processor, archived digital content from a digital data store, where the archived digital content can digitally present a physical object within a historic environment. In some embodiments, the archived digital content can be stored in the digital data store by a digitization platform, where the digitization platform transforms an originally captured content depicting the historic environment into the archived digital content. In some embodiments, the digitization platform fails to generate metadata fields to store native original metadata in the archived digital content. The method can also include performing, by the network server, image recognition on the archived digital content so as to correlate the archived digital content with digitally captured content that presents the physical object within a current environment.

The method can also include determining, by the network server, that native original metadata cannot be obtained from the archived digital content, where the native original metadata is associated with information about the physical object as presented within the historic environment. In some embodiments, determining that native original metadata cannot be obtained from the archived digital content can include one or more operations. In some embodiments, the operations can include dereferencing, by the network server, the archived digital content to detect for the native original metadata, and determining, by the network server, that the dereferencing yields a null pointer exception, where the null pointer exception results from the archived digital content not having fields to store the native original metadata. In some embodiments, dereferencing the archived digital content includes detecting where native original metadata is stored or could be stored in the archived digital content. In some embodiments, the archived digital content may provide and/or indicate a null pointer due to the lack of native original metadata, where the null pointer can trigger or otherwise cause the null pointer exception.

In some embodiments, the method can also include generating, by the network server, surrogate metadata for the archived digital content based on the digitally captured content. In some embodiments, generating the surrogate metadata can include one or more operations. The operations can include identifying, by the network server, tags within native metadata of the digitally captured content, determining, by the network server, which of the tags within the native metadata are marked as surrogate importable, and assembling, by the network server, the surrogate metadata based on the tags that are marked as surrogate importable.

In some embodiments, the method can also include embedding, by the network server, within the archived digital content, the surrogate metadata by instantiating distinct metadata fields corresponding to the historic environment, where the surrogate metadata is embedded without populating existing metadata fields provided by the archived digital content. In some embodiments, the method can also include receiving, by the network server, a content transition request associated with the physical object, and identifying, by the network server, the digitally captured content and the archived digital content based on the surrogate metadata. In some embodiments, the method can also include generating, by the network server, a content transition stream that presents the archived digital content within the current environment of the physical object, and providing, by the network server, the content transition stream to a requesting device.

According to another aspect of the concepts and technologies disclosed herein, a computer storage medium is disclosed according to an embodiment. The computer storage medium can have computer-executable instructions stored thereon that, in response to execution by a processor of a system, cause the processor to perform operations. In some embodiments, the operations can include obtaining archived digital content from a digital data store, where the archived digital content can digitally present a physical object within a historic environment. In some embodiments, the archived digital content can be stored in the digital data store by a digitization platform, where the digitization platform transforms an originally captured content depicting the historic environment into the archived digital content. In some embodiments, the digitization platform fails to generate metadata fields to store native original metadata in the archived digital content. The operations can also include performing image recognition on the archived digital content so as to correlate the archived digital content with digitally captured content that presents the physical object within a current environment.

The operations can also include determining that native original metadata cannot be obtained from the archived digital content, where the native original metadata is associated with information about the physical object as presented within the historic environment. In some embodiments, determining that native original metadata cannot be obtained from the archived digital content can include one or more operations. In some embodiments, the operations can include dereferencing the archived digital content to detect for the native original metadata, and determining that the dereferencing yields a null pointer exception, where the null pointer exception results from the archived digital content not having fields to store the native original metadata. In some embodiments, dereferencing the archived digital content includes detecting where native original metadata is stored or could be stored in the archived digital content. In some embodiments, the archived digital content may provide and/or indicate a null pointer due to the lack of native original metadata, where the null pointer can trigger or otherwise cause the null pointer exception.

In some embodiments, the operations can also include generating surrogate metadata for the archived digital content based on the digitally captured content. In some embodiments, generating the surrogate metadata can include one or more operations. The operations can include identifying tags within native metadata of the digitally captured content, determining which of the tags within the native metadata are marked as surrogate importable, and assembling the surrogate metadata based on the tags that are marked as surrogate importable.

In some embodiments, the operations can also include embedding, within the archived digital content, the surrogate metadata by instantiating distinct metadata fields corresponding to the historic environment, where the surrogate metadata is embedded without populating existing metadata fields provided by the archived digital content. In some embodiments, the operations can also include receiving a content transition request associated with the physical object, and identifying the digitally captured content and the archived digital content based on the surrogate metadata. In some embodiments, the operations can also include generating a content transition stream that presents the archived digital content within the current environment of the physical object, and providing the content transition stream to a requesting device.

According to another aspect of the concepts and technologies disclosed herein, a system is disclosed, according to another embodiment. In various embodiments, a system can be provided by a network server, such as but not limited so, an aggregation server and/or a content server, such as an augmented reality content server. In various implementations, the system can include a processor and a memory. The memory can store computer-executable instructions that, in response to execution by the processor, cause the processor to perform operations. In some embodiments, the operations can include obtaining a first visual content from a digital data store, where the first visual content is configured to digitally represent a first scene. In some embodiments, the first scene can include a historic view of a physical object within a historic environment. In some embodiments, the first scene can be digitally presented within the first visual content, where the first visual content may be configured as archived digital content. In some embodiments, the first visual content did not originally capture the first scene. The first visual content may have been generated by a digitization platform that digitized an instance of original capture content, where the original capture content originally captured the first scene by an original capture device.

In some embodiments, the operations can include performing image recognition on the first visual content so as to identify a second visual content that is digitally configured to represent a second scene. In some embodiments, the second scene can include a view of the physical object within an environment that exists later in time than the historic environment, such as a current environment. In some embodiments, the second scene can be captured and digitally represented by a second visual content, which may be configured as digitally captured content. In some embodiments, performing image recognition can include determining an amount of image features that are shared between the first visual content and the second visual content. In some embodiments, identification of the second visual content can be based on the second visual content having an amount of image features that are shared with the first visual content, where the amount of image features exceeds a shared feature threshold. The first visual content and/or second visual content may be identified and/or determined to be associated with each other based on the amount of shared image features exceeding the shared feature threshold.

In some embodiments, the operations can include determining that native original metadata cannot be obtained for and/or from the first visual content. The native original metadata includes information about the first scene digitally represented by the first visual content. In some embodiments, the native original metadata may not have been be transferred and/or captured by the first visual content when the first visual content was created by a device, such as a digitization platform. In some embodiments, determining that native original metadata cannot be obtained from the first visual content can include one or more operations, such as dereferencing the first visual content to detect for the native original metadata, and determining that the dereferencing yields a null pointer exception, where the null pointer exception can result from the first visual content not having fields to store the native original metadata.

In some embodiments, the operations can include generating surrogate metadata for the first visual content based on metadata obtained from the second visual content. In some embodiments, generating the surrogate metadata can include identifying, for the first visual content, tags and/or fields within the metadata from the second visual content; determining which of the tags and/or fields within the metadata are marked as surrogate importable; and assembling the surrogate metadata based on the tags and/or fields that are marked as surrogate importable. In some embodiments, the tags and/or fields within metadata that are marked as surrogate importable can be determined based on detection of a surrogate importable flag. In some embodiments, an instance of a tag and/or field may be marked as surrogate importable (via the surrogate importable flag) so as to indicate that the metadata (and/or portion of metadata) from the second visual content can be incorporated and/or used as surrogate metadata for the first visual content.

In some embodiments, the operations can include embedding the surrogate metadata within the first visual content, where the surrogate metadata is embedded without populating existing metadata fields provided by the first visual content. In some embodiments, embedding the surrogate metadata in an instance of content (e.g., the first visual content) eliminates and/or ceases generation of the null pointer exception, despite the content (e.g., the first visual content) continuing to lack the original instance of the native original metadata. In some embodiments, the operations can include verifying that the null pointer exception is no longer present, such as by dereferencing the first visual content after the surrogate metadata has been embedded. In some embodiments, embedding the surrogate metadata can include reconfiguring a pointer away from the native original metadata and towards the surrogate metadata (e.g., providing a memory address to a pointer within the digital data store so as to indicate or otherwise provide redirection to the surrogate metadata). In some embodiments, the operations may include, in response to dereferencing the first visual content that includes the surrogate metadata, determining that the null pointer exception is no longer triggered and/or generated. In some embodiments, the operations can include instantiating a surrogate importable flag within the surrogate metadata for one or more tags and/or fields of the surrogate metadata (e.g., one or more of distinct metadata fields and/or native original content tags for the surrogate metadata), where instantiating the surrogate importable flag can mark a tag and/or field of the surrogate metadata as surrogate importable.

In some embodiments, the operations can include receiving a content transition request, where the content transition request can be associated with the first scene and/or the second scene. In some embodiments, the content transition request can request that one or more views for each of the first scene and/or the second scene be provided in a content transition stream, which may provide and/or enable transition between one or more views of the first scene and/or the second scene. In some embodiments, the operations can include identifying the first visual content and/or the second visual content based on the surrogate metadata. The operations can include generating a content transition stream that includes the first visual content and the second visual content, where the content transition stream can present a transition between the first scene and the second scene. The operations can include providing the content transition stream to a requesting device.

In some embodiments, the operations can include receiving a content search request. In some embodiments, the content search request may include an instance of the second visual content. In some embodiments, the operations can include extracting native metadata from the second visual content and identifying an instance of surrogate metadata embedded in a first visual content based on the native metadata from the second visual content. In some embodiments, the operations can include retrieving the first visual content based on the surrogate metadata. In some embodiments, the operations can include generating a content search response that includes the first visual content, and providing the content search response to a requesting device.

It should be appreciated that the above-described subject matter may be implemented as a computer-controlled apparatus, a computer process, a computing system, a method, or as an article of manufacture such as a computer storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
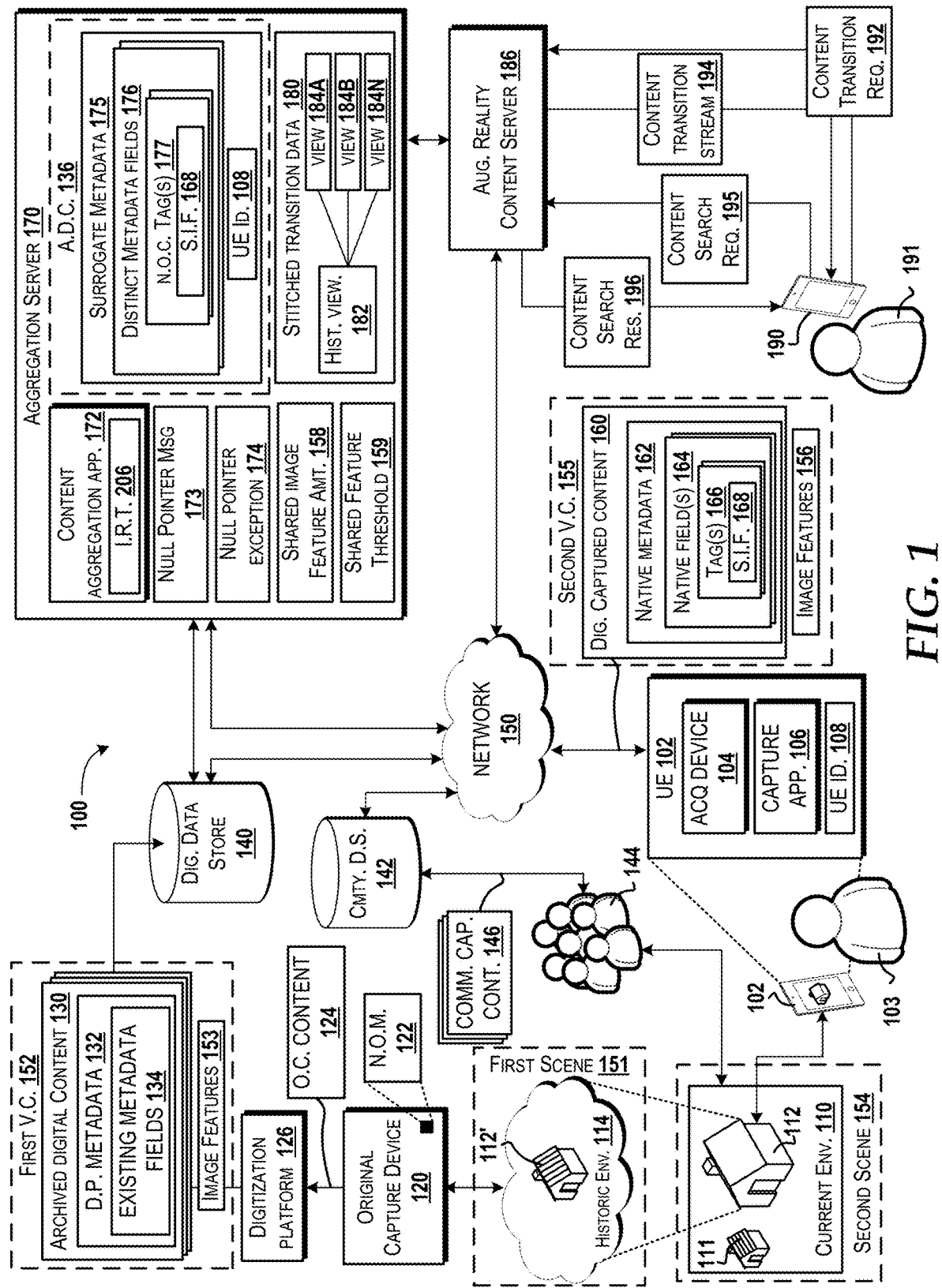
FIG. 1 is a block diagram illustrating an example operating environment for implementing surrogate metadata aggregation for dynamic content assembly, according to an illustrative embodiment.

The following detailed description is directed to surrogate metadata aggregation for dynamic content assembly, according to various embodiments. As network bandwidth increases, more data is being stored remotely in a cloud environment, thereby allowing multitudes of user equipment the ability to access or otherwise request content from a remote source. In some situations, user equipment may access or otherwise execute applications and/or services that have quality of service requirements, such as latency ceilings. With the rise of augmented reality, virtual reality, and other computing resource-intensive applications, conforming to the quality of service requirements can present technical challenges. For example, in some embodiments, millions of instances of archived digital content may be stored in a digital data store at various memory locations over the course of decades. An instance of visual content may have originally been produced in a physical format (e.g., printed film) and later converted or otherwise transformed into digital content via the use of a digitization platform, such as a photo scanner or other capture device that can digitize original capture content so as to generate archived digital content. Because uniform standards for digitizing the visual content may not have existed or otherwise followed, the millions of instances of archived digital content may not be readily searchable by network servers, thereby limiting their usability. Moreover, the archived digital content may continue to consume large amounts of memory resources that otherwise could be used in a more efficient manner if the archived digital content was in a configuration more suitable for searching. Traditional attempts at utilizing the archived digital content may cause the quality of service protocols to be exceeded, thereby limiting the ability for user equipment to call for or otherwise retrieve the archived digital content on-demand.

As such, concepts and technologies of the present disclosure provide surrogate metadata aggregation that enables dynamic content assembly so as to reduce processor runtime and decrease latency, thereby improving the ability to assemble, deliver, and render content for various applications and services, such as augmented reality and/or virtual reality applications. Aspects of the present disclosure can determine when instances of the archived digital content do not include native original content metadata that pertains to the aspects of the original device and/or original environment in which the original content was captured prior to digitization. Aspects of the present disclosure can detect that if any metadata is included in the archived digital content, the metadata actually pertains to the digitization platform, and thus does not include any metadata fields that could be used to store information that would have been stored by the native original content metadata. As such, attempts to obtain or otherwise extract the native original content metadata may yield errors because the native original content metadata does not exist within the archived digital content. A network service and/or application can identify digitally captured content that captures a physical object in a current environment, where the physical object was also captured by the archived digital content, but in a historic environment. For example, a digital image of a national monument that was recently captured can be correlated to an archived digital image, where the archived digital image includes a scan of a historic photograph capturing the same national monument in the nineteenth century. The network service and/or application can generate and aggregate surrogate metadata using digitally captured content for use with the archived digital content, where the surrogate metadata can be provided without populating existing metadata fields of the archived digital content, and thus the surrogate metadata can be instantiated alongside any existing metadata from the digitization platform. Requests for various content may be fulfilled by obtaining the archived digital content based on the surrogate metadata and stitching or otherwise assembling customized content streams for a user device using instances of the archived digital content and/or digitally captured content. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, vehicle computer systems, network access nodes, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for surrogate metadata aggregation for dynamic content assembly will be disclosed, according to an illustrative embodiment. It should be understood that the operating environment 100 and the various components thereof have been illustrated for clarity purposes to simplify the manner of discussion. Accordingly, additional and/or alternate components can be made available or otherwise implemented within the operating environment 100 without departing from the embodiments described herein. As such, the manner of discussion is provided such that one of ordinary skill in the technology can implement one or more embodiments described herein.

The operating environment 100 shown in FIG. 1 includes a user equipment ("UE") 102, a user 103, a current environment 110, a historic environment 114, an original capture device 120, a digitization platform 126, a digital data store 140, a community data store 142, a network 150, an aggregation server 170, an augmented reality ("AR") content server 186, a user equipment 190, and a user 191. The number of instances shown in FIG. 1 is for illustration purposes only and should not be construed as limiting in any way. Therefore, it is understood that zero, one, two, or more instances of each of the components shown in FIG. 1 may be provided in various embodiments. Aspects of an embodiment of the network 150 are illustrated and described below with reference to FIG. 5.

In the operating environment shown in FIG. 1, instances of user equipment, such as the UE 102 and/or the UE 190, can be associated with, or otherwise used by, a user, such as the user 103 and/or the user 191, respectively. In various embodiments, the UE 190 may be configured at least similar to the UE 102. It is understood that elements of the UE 102 can be included in embodiments of the UE 190. For clarity purposes, a discussion of the UE 102 will be provided. In various embodiments, the UE 102 can include an acquisition device, such as an acquisition device 104. The acquisition device 104 refers to one or more components that enable visual and/or audio capture for storage in a digital format. For example, the acquisition device 104 can include digital camera components and microphone components that provide the generation and storage of digital images and/or digital video, such as an instance of digitally captured content 160, which will be discussed below in further detail. In various embodiments, instances of user equipment (e.g., the UE 102 and/or the UE 190) include a processor, memory, communication components, and other circuitry that are discussed below with respect to FIG. 7.

In various embodiments, an instance of user equipment (e.g., the UE 102) can execute or otherwise activate a capture application 106. The capture application 106 can activate the acquisition device 104 to capture or otherwise engage in an environment where the user equipment is located, such as the current environment 110 where the UE 102 can be located. The capture application 106 may be configured to provide one or more operations pertaining to augmented reality, virtual reality, image capture, video capture (i.e., digital audiovisual content), or the like. In some embodiments, the capture application 106 may be a routine and/or set of executable instructions that are embedded or otherwise used by another application and/or service for content capture. It is understood that the examples provided are for illustration purposes only, and therefore should not be construed as limiting in any way.

In various embodiments, the capture application 106 can activate the acquisition device 104 to digitally capture the surroundings of the user equipment that is executing the capture application 106. For example, in an embodiment, the UE 102 may execute the capture application 106 while the UE 102 is located within the current environment 110. In the embodiment illustrated in FIG. 1, the current environment 110 includes a physical object 112 and a background object 111. The physical object 112 refers to any object that can be digitally captured and/or recorded by the acquisition device 104 so as to be included within digitally captured content, such as the digitally captured content 160. In various embodiments, the digitally captured content 160 can be configured so as to be executed and presented for playback and/or presentation on a display device. In various embodiments, the digitally captured content 160 may be configured with a particular file type according to the digital content generated, such as an image file for still digital photography or a video file for audiovisual content capture. Examples of file types for the digitally captured content 160 can include, but should not be limited to, high efficiency image file ("HEIF") format, high efficiency video coding ("HEVC") format, or another encoding format that is understood by one of skill in the technology. It is understood that the examples provided are for illustration purposes only, and therefore should not be construed as limiting in any way.

In various embodiments, at a particular time instance, the physical object 112 located within the current environment 110 can be digitally captured and presented in an instance of the digitally captured content 160. For example, in some embodiments, when the capture application 106 is executed on the UE 102 and the acquisition device 104 is used to capture an instance of the current environment 110, then an instance of digitally captured content 160 may be generated.

In this example, because the capture application 106 executing on the UE 102 created the digitally captured content 160, the capture application 106 may generate and embed an instance of native metadata, such as native metadata 162, within the digitally captured content 160. The native metadata 162 can include one or more instances of a native field 164 that stores metadata items. In some embodiments, each instance of the native field 164 can provide a tag 166, where the tag 166 can present a label or other searchable string that provides a description of the type of information that the native field 164 stores. As used herein, the phrase "native metadata" (e.g., the native metadata 162) refers to metadata that is generated by the particular device that originally captured the object depicted or otherwise presented in the content. For example, because the UE 102 may have been the original (i.e., initial) device that was used to digitally capture the physical object 112 within the current environment 110 via generation and storage of the digitally captured content 160, the native metadata 162 pertains to the UE 102 and information about the current environment 110 and/or the physical object 112 from the perspective of the UE 102. In some embodiments, the native metadata 162 may be configured so as to conform to one or more industry formats and/or standards, such as but not limited to, an Extensible Metadata Platform ("XMP"), and International Press Telecommunications Council Schema, an Exchangeable image file ("EXIF") format, or another standard. Examples of one or more instance of the native field 164 and the tag 166 are discussed below with respect to FIG. 2.

In some embodiments, an instance of user equipment may include an equipment identifier, such as UE identifier 108. In various embodiments, messages, requests, responses, content, and/or communications to and/or from an instance of user equipment (e.g., the UE 102 and/or the UE 190) may include an instance of the UE identifier 108 for use in identification purposes of a corresponding UE, such as the UE 102 and/or the UE 190. Examples of the UE identifier 108 can include, but are not limited to, a serial number, an International Mobile Subscriber Identifier ("IMSI"), a Mobile Equipment Identifier ("MEID"), a telephone number, an Internet Protocol address, a profile number, an address, a user-name, or one or more strings indicating a unique identity of the user equipment and/or any component associated therewith. In some embodiments, an instance of the UE identifier 108 may be included within an instance of the digitally captured content 160 so as to indicate that the corresponding equipment generated the digitally captured content 160. For example, in an embodiments, the digitally captured content 160 may include an instance of the UE identifier 108 corresponding to the UE 102 because the UE 102 executed the capture application 106 to generate the digitally captured content 160. It should be understood that the examples provided are for illustration purposes only, and therefore should not be construed as limiting in any way.

In some embodiments, the physical object 112 within the current environment 110 may have existed at a point in time prior to the current environment 110, such as for months, years, decades, centuries, or millennia. Therefore, for illustration purposes only, the operating environment 100, at a point in time, may include a historic environment 114 and a physical object 112' located within, and/or proximate to, the historic environment 114. The physical object 112' refers to the physical object 112, but existing within the historic environment 114, and therefore at a point in time prior to the current environment 110. It is understood that use of the phrase "current environment" refers to a state of an environment (and one or more objects located therein) at a point in time after the historic environment 114. Therefore, the current environment 110 may not necessarily have to correspond with a real-time state of existence, but rather can refer to an environment as it existed at a point in time when the user 103 used a user equipment (e.g., the UE 102) to capture the physical object 112 and generate an instance of the digitally captured content 160 that includes the physical object 112 as it exists within the current environment 110. Therefore, it is understood that the historic environment 114 includes the physical object 112 at a prior state of existence within its surroundings at a time prior to the current environment 110, and thus the physical object 112 is illustrated as the physical object 112' within the historic environment 114.

In some instances, the physical object 112' may appear different and/or exist in a different state when in the historic environment 114 than the physical object 112 in the current environment 110. For example, the physical object 112' may, in an embodiment, include a building that was damaged by a fire within the historic environment 114. In an embodiment, an instance of the original capture device 120 may have been present within and/or proximate to the historic environment 114 so as to capture the physical object 112' by generating an instance of original capture content, such as original capture content 124. In an embodiment, the original capture content 124 may be configured as a film photograph because the original capture device 120 may, in an embodiment, have been configured as a film camera. In another embodiment, the original capture device 120 may be configured as a digital camera (or any other user equipment capable of generating the original capture content 124 that captures and presents the physical object 112 within the historic environment 114), and thus an instance of the original capture content 124 may, in another embodiment, be configured as a digital photograph, a frame from a video file, or any other image format that can capture and preserve an image of the physical object 112' as it existed within the historic environment 114. At a later point in time (i.e., at a point in time later than when the original capture content 124 which captured the physical object 112' within the historic environment 114 was created), the physical object 112' may have been repaired, and thus may exist (or did exist) as the physical object 112 within the current environment 110. As such, attributes of the physical object 112 may differ from the physical object 112' within the different environment (i.e., from the historic environment 114 to the current environment 110). Examples of attributes of a physical object and/or environment (e.g., any of the physical objects 112, 112', the historic environment 114, and/or the current environment 110) can include, but should not be limited to, physical appearance, material composition (i.e., what materials are included within the object and/or environment), component composition (i.e., what components are included in, on, and/or around the object and/or environment), or the like. Therefore, the UE 102 may generate an instance of the digitally captured content 160 that includes and captures the physical object 112 within the current environment 110. It should be understood that the examples provided are for illustration purposes only, and therefore should not be construed as limiting in any way.

In various embodiments, the operating environment can include a scene that can be captured and digitally represented, such as a first scene 151 and/or a second scene 154. In the embodiment illustrated in FIG. 1, an instance of the first scene 151 can include the physical object 112' within the historic environment 114. In an embodiment, the second scene 154 can include the physical object 112 within the current environment 110. In some embodiments, the second scene 154 may be associated with the first scene 151. For example, in some embodiments, the second scene 154 may be associated with the first scene 151 because the second scene 154 may be the same as (or otherwise very similar to) the first scene 151, but at a different point in time. In some embodiments, one or more objects are the same and/or similar and may appear (or otherwise exist) in different locations at different points in time (e.g., the physical object 112' existing in the first scene 151 and the physical object 112 existing within the second scene 154). In some embodiments, one or more other objects may be included within a scene, such as background object 111 that may be located within the current environment 110. In some embodiments, an instance of a scene (e.g., the first scene 151 and/or the second scene 154) may correspond to, include, and/or pertain to a particular configuration and/or orientation of one or more objects relative to each other and/or their surroundings. In some embodiments, a scene (e.g., the first scene 151 and/or the second scene 154) may include or otherwise be associated with an object and/or environment that has a physical structure. For example, the physical object 112 within current environment 110 may collectively provide the second scene 154, where an instance of the physical object 112 may correspond to a national monument and the current environment 110 may correspond to a national park. In some embodiments, a scene (e.g., the first scene 151 and/or the second scene 154) may include or otherwise be associated with an object and/or environment that has a virtual structure and/or is digitally created within a virtual environment so as to provide virtual objects within a virtual environment, where the virtual objects digitally mimic the configuration of a physical, real-world object within a physical, real-world environment. In various embodiments, a scene (e.g., the first scene 151 and/or the second scene 154) can be captured by a device that generates visual content that presents and/or depicts the scene in a particular configuration (e.g., the UE 102 that can capture the second scene 154 and create an instance of digitally captured content 160 that digitally presents and represents the second scene 154, and/or the original capture device 120 that can capture the first scene 151 and generate original capture content 124, which in turn may be digitized by digitization platform 126 that creates archived digital content 130). It is understood that use of the terms "first," "second," and/or other numbers are for clarification purposes only, and therefore should not necessarily be construed or otherwise interpreted as indicating a preference, hierarchy, order, and/or value. It should be understood that the examples provided are for illustration purposes only, and therefore should not be construed as limiting in any way.

For clarity purposes only, aspects and/or operations of the present disclosure that are associated with and/or reference the first scene 151 may be discussed by referring to the physical object 112' and/or the historic environment 114 within the operating environment 100; however, it is understood that instances of the first scene 151 may be different in other embodiments. Similarly, aspects and/or operations of the present disclosure that are associated with and/or reference the second scene 154 may be discussed by referring to the physical object 112 and/or the current environment 110 within the operating environment 100; however, it is understood that instances of the second scene 154 may be different in other embodiments. In some embodiments, the first scene 151 and the second scene 154 may be associated with each other in at least some aspect, and therefore instances of visual content (e.g., the first visual content 152 and the second visual content 155). It should be understood that the examples provided are for illustration purposes only, and therefore should not be construed as limiting in any way.

In various embodiments, the original capture device 120 refers to any device and/or equipment that captures, by generating an instance of original capture content 124, the physical object 112' within the historic environment 114. In an embodiment, the original capture device 120 may be configured as a film camera that can generate one or more instances of the original capture content 124 configured in a photographic film format. In another embodiment, the original capture device 120 may be configured as a digital camera or any user equipment that can generate one or more instance of the original capture content 124 configured in a digital format. It should be understood that the examples provided are for illustration purposes only, and therefore should not be construed as limiting in any way. In various embodiments, information about the physical object 112', the historic environment 114, the original capture device 120, and/or the original capture content 124 may be included in or otherwise represented by native metadata corresponding to the original capture content 124, such as a native original metadata 122. In various embodiments, an instance of the native original metadata 122 can include information about the physical object 112' as presented within the historic environment 114. In some embodiments, the native original metadata 122 can include information about and/or pertaining to the original capture device 120 and/or the location of the original capture device 120 relative to the physical object 112' within the historic environment 114.

In some embodiments, the native original metadata 122 may include descriptive, structural, and/or administrative metadata about the original capture content 124, the physical object 112', the historic environment 114, and/or the original capture device 120 prior to the original capture content 124 being captured, scanned, transformed, reconfigured, and/or digitized by the digitization platform 128. For example, the native original metadata 122 may include information as to how the physical object 112', the historic environment 114, the original capture device 120, and/or the original capture content 124 was identified and/or described prior to the digitization platform 126 digitizing, transforming, or otherwise handling the original capture content 124 so as to create an instance of archived digital content 130. Further discussion of the digitization platform 126 and the archived digital content 130 is provided below. In some embodiments, the native original metadata 122 can include information as to how the original capture content 124 was organized prior to the creation of the corresponding instance of the archived digital content 130. In some embodiments, the native original metadata 122 can include information as to the relative location and/or positioning of the original capture device 120 relative to the physical object 112' within the historic environment 114. In some embodiments, the native original metadata 122 can include information about the format of the original capture content 124 and/or the date in which the original capture content 124 was created by the original capture device 120. The native original metadata 122 can include information regarding the orientation and/or location of the original capture device 120 at the time that the original capture content 124 was first created, and/or information pertaining to the original capture content 124 prior to creation of the archived digital content 130 (e.g., when the physical object 112' within the historic environment 114 was originally captured by the original capture device 120). It should be understood that the examples provided are for illustration purposes only, and therefore should not be construed as limiting in any way.

In some embodiments, the native original metadata 122 may have existed, stored, and/or resided alongside, separate, and/or otherwise apart from the original capture content 124, and therefore not embedded or included within the original capture content 124. For example, in some embodiments, the native original metadata 122 may have resided within a log that was stored on a computer system. In some embodiments, the native original metadata 122 may have been embedded or otherwise included in the original capture content 124 when, in an embodiment, the original capture content 124 was configured in a digital format. In some embodiments, the native original metadata 122 may have been erased, deleted, or otherwise not retained, and thus cannot be retrieved. In some embodiments, the native original metadata 122 may not have been created in the first place for a particular, corresponding instance of the original capture content 124.

The operating environment 100 can include one or more instances of the digitization platform 126. The digitization platform 126 can include a scanner, a photocopy machine, an application (e.g., a photo editing application), or any other device or component that is configured to digitize, transform, reconfigure, and/or scan the original capture content 124, which in turn enables an image and/or representation of the physical object 112' within the historic environment 114 to be transferred, captured, included, and/or reproduced by an instance of archived digital content, such as the archived digital content 130. For example, in an embodiment, the digitization platform 126 may include a scanner that scans and digitizes the original capture content 124 (which may be in the format of a printed film photograph) so as to create an instance of the archived digital content 130. The archived digital content 130 can capture, present, and/or provide a digital image of the physical object 112' within the historic environment 114 as presented by the original capture content 124. The digitization platform 126 did not initially capture the physical object 112' within the historic environment 114 because the digitization platform 126 may not have been present or otherwise available within the historic environment 114. Therefore, the digitization platform 126 may be distinct or otherwise separate from the original capture device 120.

In embodiments, the operating environment 100 can include instances of visual content, such as a first visual content 152 and/or a second visual content 155, that are created by one or more devices and are configured for storage and access from a data storage device, such as the digital data store 140, the community data store 142, or another memory device. As used herein, "visual content" refers to one or more instances of digital data that provides, presents, depicts, and/or is configured to digitally represent a visual image that can be displayed on a user interface of a device, such as the UE 102 and/or the UE 190. For example, in an embodiment, an instance of the first visual content 152 can include and/or digitally represent the first scene 151 that may include one or more objects with within an environment, such as the physical object 112' within the historic environment 114. In an embodiment illustrated in FIG. 1, an instance of the first visual content 152 can be provided by an instance of the archived digital content 130. Therefore, in some embodiments, the first visual content 152 may lack an instance of the native original metadata 122, as discussed herein. For clarity purposes, one or more instances of the first visual content 152 will be discussed with respect to one or more instances of the archived digital content 130. In various embodiments, an instance of the second visual content 155 may be provided by, include, or otherwise correspond to, one or more instances of the digitally captured content 160. In some embodiments, an instance of the second visual content 155 can include and/or digitally represent the second scene 154 that may include one or more objects within an environment, such as the physical object 112 within the current environment 110. It is understood that use of the terms "first," "second," or the like, are provided for clarification purposes only, and therefore should not be construed as limiting.

In various embodiments, the digitization platform 126 can generate an instance of the archived digital content 130. In some embodiments, the archived digital content 130 may be generated based on the original capture content 124, such as by digitizing, scanning, photographing, transferring, or otherwise capturing the representation and presentation of a scene (e.g., the first scene 151), which may include the physical object 112' in a state of existence and appearance within the historic environment 114. Instances of the archived digital content 130 can be configured in a digital format for storage and/or handling by one or more computer systems, data stores, and/or network devices, such as discussed herein according to various embodiments. For example, an instance of the archived digital content 130 may be configured as a digital image, a screen capture of a video, a portion of a video, and/or any other data file that is configured to provide presentation and representation of the physical object 112' within the historic environment 114 (as captured by the original capture content 124) on a display device. In some embodiments, an instance of the original capture content 124 may be configured as a printed film photograph, and therefore the digitization platform 126 can scan, capture, or otherwise digitize the original capture content 124 so as to generate an instance of the archived digital content 130 for storage within a computer-readable data store. In other embodiments, the original capture content 124 may be configured in a first digital format, and the digitization platform 126 may transform, reconfigure, capture, and/or edit data from the original capture content 124 so as to create an instance of the archived digital content 130 that is separate and distinct from the original capture content 124 (e.g., being in a second digital format), while still enabling the archived digital content 130 to capture, present, represent, provide, and/or include a view of the physical object 112' within the historic environment 114 as presented by the original capture content 124. Therefore, in various embodiments, an instance of the archived digital content 130 can provide a presentation and historic view of the physical object 112' within the historic environment 114, thus capturing and presenting how the physical object 112 from the current environment 110 did exist and/or could have existed at a point in time prior to the current environment 110 (i.e., how the physical object 112' appeared within the historic environment 114).

Irrespective of the particular format of the original capture content 124, in some embodiments, when the digitization platform 126 creates the archived digital content 130, the native original metadata 122 (and any information that is or could have been included therein) may not be included and/or embedded in the archived digital content 130. Therefore, the archived digital content 130 does not include the native original metadata 122 corresponding to the original capture content 124. For example, in an embodiment, the native original metadata 122 may have been lost, erased, misplaced, and/or not created prior to the digitization platform 126 creating the archived digital content 130 based on the original capture content 124. In another example, the original capture content 124 may be in a physical format (e.g., a film photograph), and thus any information that would correspond to, or otherwise have been provided by, the native original metadata 122 may have existed separate from the original capture content 124, and thus the native original metadata 122 is not transferred by the digitization platform 126, and thus not embedded within the archived digital content 130. In another embodiment, the original capture content 124 may have existed or otherwise been stored in a digital format and the native original metadata 122 may have been included and/or embedded therein; however, the digitization platform 126 may have failed to extract, obtain, and/or transfer the native original metadata 122, and thus any information that would have been included in the native original metadata 122 is not included within the archived digital content 130. Therefore, in various embodiments, when the digitization platform 126 captures, scans, transforms and/or digitizes the original capture content 124 and in turn generates, creates, handles, and/or instantiates the archived digital content 130, each instance of the archived digital content 130 does not include the native original metadata 122 pertaining to the physical object 112' within the historic environment 114. In some embodiments, an instance of the archived digital content 130 may be referred to as archived visual content, although this may not necessarily be the case for every implementation.

In various embodiments, instances of the archived digital content 130 can include metadata that is independently created by the digitization platform 126, such as digitization platform metadata 132. The digitization platform metadata 132 may be created by the digitization platform 126 during and/or after the process of generating the archived digital content 130. In some embodiments, when the archived digital content 130 is generated and stored, the only metadata that is embedded or otherwise included therein is the digitization platform metadata 132. As such, upon generation, any metadata fields that exist within the archived digital content 130, such as existing metadata fields 134, were created by the digitization platform 126. The digitization platform metadata 132 refers to any metadata and/or information that was created independently by the digitization platform 126 without reliance on and/or reference to, the native original metadata 122. When the digitization platform 126 creates the archived digital content 130, any metadata that is embedded within the archived digital content 130 by the digitization platform 126 (e.g., the digitization platform metadata 132 stored in any of the existing metadata fields 134) does not pertain to, reference, and/or include the native original metadata 122 and/or information that could and/or would have been included in the native original metadata 122. The digitization platform metadata 132 can include descriptive, structural, and/or administrative metadata pertaining to and/or about the digitization process by the digitization platform 126, such as a file name provided by the digitization platform 126, time of creation by the digitization platform 126, file size of the archived digital content 130, or other information about the creation of the archived digital content 130. Because the existing metadata fields 134 were created by the digitization platform 126, any metadata and/or information that is stored and/or would be stored therein (e.g., the digitization platform metadata 132) is attributed to the digitization platform 126, and therefore the digitization platform metadata 132 and the existing metadata fields 134 fail to provide attribution to the original capture device 120 and/or distinguish from the native original metadata 122. Moreover, later inclusion (i.e., after the archived digital content 130 is created) of the native original metadata 122 within one or more of the existing metadata fields 134 may overwrite any of the digitization platform metadata 132 independently created by the digitization platform 126. As such, if any portion of the native original metadata 122 were to be included or otherwise written to the existing metadata fields 134, then information from the digitization platform metadata 132 may be prevented from being embedded within the archived digital content 130. Therefore, the existing metadata fields 134 of the archived digital content 130 do not distinguish (or otherwise enable distinguishment) between the digitization platform metadata 132 generated independently by the digitization platform 126 and the native original metadata 122 about the original capture content 124 (e.g., any information pertaining to the original capture device 120, the physical object 112', the historic environment 114, and/or the original capture content 124 which would have been provided by the native original metadata 122). Stated differently, the existing metadata fields 134 provided by the archived digital content 130 fail to include metadata tags and/or labels that distinguish metadata about the archived digital content 130 and the digitization platform 126 (i.e., the digitization platform metadata 132) from metadata corresponding to the original capture content 124 (e.g., any metadata pertaining to the original capture device 120, the physical object 112', and/or historic environment 114, which may have been included in or otherwise provided by the native original metadata 122). In various embodiments, because the archived digital content 130 does not include the native original metadata 122, the existing metadata fields 134 do not include, or are otherwise not associated with, a memory address that points to the native original metadata 122. In some embodiments, the lack of memory address prohibits or otherwise does not allow pointing to the native original metadata 122, which may cause or otherwise lead to the existence of a null pointer and/or a null pointer exception, such as a null pointer exception 174, which will be discussed below in further detail.

In various embodiments, the operating environment 100 can include one or more instances of a data storage device, such as a database, a memory, and/or other data store. For example, in some embodiments, the operating environment 100 can include the digital data store 140 and/or a community data store 142. The functionality of a data store (e.g., any of the digital data store 140 and/or the community data store 142) can be provided by one or more computer storage medium, server computers, desktop computers, mobile equipment, network devices, other computer systems, combinations thereof, or the like. In the illustrated embodiments, the functionality of the digital data store 140 and/or the community data store 142 may be provided by one or more instance of a computer system, such as discussed below with respect to FIG. 6. In some embodiments, the digital data store 140 and/or the community data store 142 may be hosted and/or provided by a third party provider, such as a cloud storage platform. In various embodiments, instances of the digital data store 140 and/or the community data store 142 include one or more instances of memory. Instances of memory can include volatile and/or non-volatile memory implemented in any method or technology for storage of information, where the information can be configured in a form such as computer-executable instructions, data structures, software program modules, or other data or content disclosed herein. It is understood that, in the claims use of the term "memory" and "computer storage medium" and variations thereof does not include, and shall not be construed to include, a wave or a signal per se and/or communication media. In various embodiments, a data store (e.g., the digital data store 140 and/or the community data store 142) may be accessed directly and/or indirectly by one or more computing systems and/or network, such as by any of the aggregation server 170, the digitization platform 126, and/or the network 150.

In various embodiments, the digital data store 140 can store one or more instances of the archived digital content 130. The archived digital content 130 may be made available or otherwise accessible to one or more elements of the operating environment 100, such as but not limited to, the aggregation server 170, the AR content server 186, the UE 102, or any other computer system. In some embodiments, instances of the digitally captured content 160 may be stored in the digital data store 140 and/or the community data store 142, although this may not necessarily be the case. The digital data store 140 may store instances of the archived digital content 130 from a one or more instances of the digitization platform 126, and therefore the information embedded within the various instances of the archived digital content 130 may not necessarily conform to a uniform standard. As such, in some embodiments, instances of the archived digital content 130 may not be sorted and/or stored in a uniform format. It is understood that the examples provided are for illustration purposes only, and therefore should not be construed as limiting in any way.

In various embodiments, the community data store 142 can refer to any data store that stores and/or provides instances of digital content corresponding to the physical object 112 within the current environment 110 and/or the physical object 112' within the historic environment 114. For example, the community data store 142 may include one or more instances of community captured content 146. An instance of the community captured content 146 may be created by a user equipment that visited the current environment 110 and captured the physical object 112 using a camera or other acquisition device. In general, a plurality of user equipment may have visited the current environment 110 and/or otherwise captured the physical object 112 at a point in time. Therefore, instances of equipment that is used to create the community captured content 146 may be collectively referred to as community devices 144. The community devices 144 can include a plurality of instances of user equipment that may each independently generate instances of digital content files that correspond with the current environment 110, such as instances of community captured content 146. An instance of the community captured content 146 can digitally capture, store, and present the physical object 112 within the current environment 110 at various points in time and from various angles. Therefore, each instance of the community captured content 146 can provide visual content (e.g., in the form of a digital photograph and/or an video file, such as one or more instances of the first visual content 152 and/or the second visual content 155), and in some implementations, the community captured content 146 may pertain to the physical object 112 and may be uniquely created by a particular user equipment from among the community devices 144. In some embodiments, the community devices 144 may be referred to as a plurality of user equipment, where one or more of the user equipment can generate at least one instance of the community captured content 146. In some embodiments, the community captured content 146 may be configured the same as, or at least similar to, an instance of the digitally captured content 160 (and thus may be considered to be, or otherwise referred to as, a third visual content that is configured at least similar to the second visual content 155). Therefore, in some embodiments, instances of the community captured content 146 can each include a specific instance of the native metadata 162 created by the user equipment from the community devices 144. In some embodiments, an instance of the community captured content 146 may be configured the same as, or at least similar to, an instance of the archived digital content 130 (and thus may be considered to be, or otherwise referred to as, another visual content that is configured at least similar to the first visual content 152.) In some embodiments, the community data store 142 may be associated with a social media platform or other crowd-populated content platform that hosts, stores, or otherwise makes accessible various instances of the community captured content 146 via the network 150, although this may not necessarily be the case. It is understood that the examples provided are for illustration purposes only, and therefore should not be construed as limiting in any way.

The operating environment 100 can include one or more instances of the aggregation server 170. The aggregation server 170 can include a processor, a memory, communication components, and other equipment that support the functionality of one or more operations discussed herein. Therefore, the aggregation server 170 may be configured the same as, or at least similar to, a computer system discussed below with respect to FIG. 6. The aggregation server 170 may be associated with a communications service provider and/or another entity that can provide an aggregation service related to content retrieval and/or content handling. In some embodiments, one or more instances of a computer system, such as the aggregation server 170, can support, host, store, and/or execute a content aggregation application ("CAA") 172. The CAA 172 can enable and facilitate network discovery and searching of instances of the archived digital content 130 that lack native metadata from the original capture content 124 (i.e., that lack the native original metadata 122).

In various embodiments, the CAA 172 can obtain, access, and/or analyze an instance of visual content, such as the first visual content 152 (which can correspond to an instance of the archived digital content 130). In some embodiments, the CAA 172 may obtain the archived digital content 130 from the digital data store 140. The CAA 172 may be configured to provide image recognition on one or more instances of visual content (e.g., the archived digital content 130, the digitally captured content 160, the community captured content 146, etc.) such as via an image recognition tool 206 that is also discussed below with respect to FIG. 2. In some embodiments, the CAA 172 may use image recognition (e.g., feature detection) to identify visual features (e.g., instances of the image features 153) presented by the archived digital content 130, and therefore determine whether one or more instances of digital content may be associated with archived digital content 130, such as an instance of the digitally captured content 160 and/or one or more instances of the community captured content 146. In various embodiments, an instance of visual content can include and/or provide image features, such as image features 153 corresponding to the first visual content 152 and image features 156 corresponding to the second visual content 155). It is understood that various instances of image features (e.g., image features 153 and/or image features 156) can have and/or exhibit an image feature type, such as but not limited to edges, corners, interest points, defined regions of interest (e.g., defined regions within a visual image that share an attribute, such as a color, edge, border, etc.), ridges, and/or any other feature that may be detectable to the image recognition tool 206. For example, the archived digital content 130 may present an image of the physical object 112' within the historic environment 114, and the digitally captured content 160 may present an image of the physical object 112 within the current environment 110 (which corresponds to the historic environment 114 at a later point in time). The CAA 172 may invoke the image recognition tool 206 to perform image analysis (e.g., image feature detection, feature comparison, etc.) that enables image recognition and association between two or more instances of visual content, such as but not limited to the archived digital content 130 and the digitally captured content 160 (which in the embodiment illustrated in FIG. 1 can correspond to an instance of the first visual content 152 and the second visual content 155, respectively).

As illustrated in FIG. 1, the first visual content 152 can include and provide one or more instances of the image features 153, and therefore the first visual content 152 can have and/or provide a first image feature amount (i.e., the total number of image features 153 provided by the first visual content 152). Similarly, the second visual content 155 can include and provide one or more instances of the image features 156, and therefore the second visual content 155 can have and/or provide a second image feature amount (i.e., the total number of image features 156 provided by the second visual content 155). In some embodiments, the CAA 172 and/or the image recognition tool 206 can analyze and compare the image features 153 and the image features 156 with each other, and in turn determine whether the first visual content 152 and the second visual content 155 share one or more image features. Stated differently, at least one image feature from the image features 153 may match (i.e., be configured so as to share a visual configuration) at least one image feature from the image features 156. Therefore, the total number of image features that are shared (i.e., match) between the image features 153 and the image features 156 may be determined and stored as a shared image feature amount 158. In some embodiments, the shared image feature amount 158 can be configured as a parameter stored by and/or accessible to, the CAA 172 and/or the image recognition tool 206. In some embodiments, the shared image feature amount 158 may be configured and/or defined in terms of a percentage value of shared image features, where 0% may indicate that no image features are shared and 100% can indicate that all of the image features between two instances of visual content are shared. In some embodiments, the shared image feature amount 158 may be compared against a shared feature threshold 159. The shared feature threshold 159 may indicate the minimum amount of shared image features that would indicate a match and/or association between two (or more) instances of visual content. In some embodiments, the shared feature threshold 159 may be configured as a defined and/or configurable percentage value (e.g., 60%, 75%, 90%, etc.) that provides the minimum threshold needed to indicate that one instance of visual content matches, is associated with, and/or is visually similar to, another instance of visual content. For example, in some embodiments, identification of the second visual content 155 can be based on the second visual content 155 and the first visual content 152 sharing 80% of image features (i.e., 80% of the image features 153 and the image features 156 are shared), which may be indicated by the shared image feature amount 158. In this example, the shared feature threshold 159 may be configured at 75%, thus indicating that at least 75% of image features should be shared between instances of visual content in order to indicate an association exists (e.g., each instance being visually similar to each other). Therefore, in this example, the shared image feature amount 158 of 80% exceeds the shared feature threshold 159 of 75%. As such, in some embodiments, the first visual content 152 and the second visual content 155 may be identified and/or determined to be associated with each other (e.g., having a digital configuration that provides visual similarity) based on the amount of shared image features (e.g., provided by the shared image feature amount 158) exceeding the shared feature threshold 159. It is understood that the examples provided are for illustration purposes only, and therefore should not be construed as limiting in any way.

In some embodiments, two or more instances of visual content (e.g., the first visual content 152 and the second visual content 155) may be determined to be associated with each other because each visual content digitally presents the same and/or similar object. For example, in some embodiments, CAA 172 and/or the image recognition tool 206 can enable a user (e.g., the user 103) to select or otherwise indicate an object digitally presented by an instance of visual content, such as the digitally captured content 160. For example, the UE 102 may present the second visual content 155 on a user interface, and turn the user 103 can input a boundary around the object (and/or select a portion of the object). The CAA 172 and/or the image recognition tool 206 may perform image recognition and/or feature detection that is limited to image features (e.g., the image features 156) that are within the indicated boundary. This can enable the CAA 172 to search for objects that may appears in different environments, and therefore even though a majority portion of image features between two scenes may be different, the same and/or similar object may be presented, which is reflected in a higher concentration of shared image features when the analysis is limited to image features within the boundary provided. Put simply, the shared image feature amount 158 may not necessarily have to correspond with the number of image features that are shared between all available image features from two instances of visual content. Rather, a defined portion (e.g., within a boundary) of the visual content can be analyzed, and instances of image features from one visual content (e.g., the image features 156 from the second visual content 155) that are shared with a portion of another visual content (e.g., the image features 153 from the first visual content 152) can be reflected by (and thus indicated by) the shared image feature amount 158. As such, in some embodiments, the shared feature threshold 159 may indicate a threshold for the minimum amount of shared features within an indicated boundary, where the boundary may be defined by user input and/or by a default boundary (e.g., by default analyzing the entire visual content unless otherwise restricted by input that defines a boundary for comparison).

In some embodiments, the image recognition tool 206 may be provided by a third-party application and/or service, and therefore in some embodiments, the CAA 172 may access, invoke, or otherwise perform image recognition using one or more tools, applications, and/or services from the image recognition tool 206. In an embodiment, the image recognition tool 206 may execute on a user equipment, such as the UE 102, and therefore the CAA 172 may instruct or otherwise invoke the UE 102 to determine associated features of objects presented by instances of the archived digital content 130 and report the number of image features 156 (and/or other information) back to the CAA 172. It is understood that one or more software processes, algorithms, applications, and/or techniques known and understood by one of ordinary skill in the technology may be implemented to facilitate and support image recognition, and therefore further discussion of image recognition will not be provided. It is understood that the examples provided are for illustration purposes only, and therefore should not be construed as limiting in any way.

In various embodiments, although the physical object 112 within the current environment 110 may appear different (i.e., not identical) than the physical object 112' within the historic environment 114, the physical object 112 may be identified as being the same as, and/or associated with, the physical object 112' within the historic environment 114. As such, the CAA 172 may identify and determine that the digitally captured content 160 that captures the physical object 112 should be associated with, or otherwise should correspond to, the archived digital content 130 that captures the physical object 112' within the historic environment 114. The CAA 172 can use image recognition to make the determination that the archived digital content 130 and the digitally captured content 160 are and/or should be associated with each other. Therefore, the CAA 172 can correlate an instance of the archived digital content 130 with an instance of the digitally captured content 160 (and/or an instance of the community captured content 146) based on representations and/or presentations of the same physical object (or at least similar physical object) within different environments (e.g., instances of the current environment 110 and/or the historic environment 114).

In some embodiments, the CAA 172 may determine that an instance of the archived digital content 130 does not include native metadata that pertains to the original capture content 124, the original capture device 120, and/or the physical object 112' within the historic environment 114, such as the native original metadata 122. In some embodiments, the CAA 172 may determine that any metadata existing within the existing metadata fields 134 of the archived digital content 130 (e.g., the digitization platform metadata 132) does not include or otherwise provide the native original metadata 122. As such, the CAA 172 may not be able to search for information pertaining to the physical object 112', the historic environment 114, the original capture device 120, and/or the original capture content 124 based on the existing metadata fields 134 of the archived digital content 130. In some embodiments, the CAA 172 may perform image recognition on the archived digital content 130 before and/or after determination that the archived digital content 130 does not include the native original metadata 122. Therefore, in some embodiments, the CAA 172 may perform image recognition in response to determining that the archived digital content 130 does not include the native original metadata 122. It is understood that the examples provided are for illustration purposes only, and therefore should not be construed as limiting in any way.

In some embodiments, the CAA 172 can determine that the native original metadata 122 cannot be obtained from, and thus is not included in, the archived digital content 130. In some embodiments, the CAA 172 may analyze the existing metadata fields 134 and determine that the existing metadata fields 134 correspond with, or otherwise include, the digitization platform metadata 132. In some embodiments, the CAA 172 may determine that the native original metadata 122 cannot be obtained from the archived digital content 130 based on detection of a null pointer exception, such as null pointer exception 174. For example, in some embodiments, the CAA 172 may dereference the archived digital content 130 to detect for the native original metadata 122. Specifically, in some embodiments, the CAA 172 may be configured to identify and dereference a pointer (which may be provided by the aggregation server 170 and/or the digital data store 140) that should provide a memory location address for metadata (e.g., the native original metadata 122) that is assumed to be provided (but may not actually be provided) by the archived digital content 130, and in turn the pointer should allow the CAA 172 to obtain any information about the native original metadata 122 from the archived digital content 130. As discussed above, the archived digital content 130 does not include the native original metadata 122. Therefore, when the CAA 172 attempts to dereference the archived digital content 130, the CAA 172 may determine that the dereferencing yields an instance of the null pointer exception 174. In various embodiments, an instance of the null pointer exception 174 can occur from the archived digital content 130 not having (i.e., not comprising) separate metadata fields that are specific to, and thus store, the native original metadata 122 (because the existing metadata fields 134 pertain to and include the digitization platform metadata 132 and do not pertain to or include the native original metadata 122). Therefore, when the archived digital content 130 is being dereferenced (i.e., when dereferencing a pointer that is intended to point to metadata fields for instances of native original metadata associated with the archived digital content 130), the CAA 172 can determine that the pointer is a null pointer because there does not exist a memory address for the native original metadata 122, and therefore an instance of the null pointer exception 174 is triggered or otherwise generated. In some embodiments, an alert and/or message, such as a null pointer message 173, may be generated to indicate the presence and/or existence of the null pointer exception 174. In some embodiments, the null pointer message 173 may be generated based on dereferencing the archived digital content 130 and detecting the null pointer exception 174.

In various embodiments, when the CAA 172 determines or otherwise detects that the archived digital content 130 does not include metadata that pertains to the native original metadata 122, the CAA 172 may generate surrogate metadata, such as surrogate metadata 175, for the archived digital content 130. In some embodiments, an instance of the surrogate metadata 175 can be generated based on one or more instance of the native metadata 162 from one or more of the digitally captured content 160 and/or the community captured content 146. In some embodiments, the surrogate metadata 175 can be configured to exist and reside separate from the digitization platform 126 and the existing metadata fields 134. For example, the CAA 172 can generate one or more distinct metadata fields 176 that are reserved for, and can store, the surrogate metadata 175. The distinct metadata fields 176 may be separate from the existing metadata fields 134 of the archived digital content 130, and therefore the surrogate metadata 175 does not overwrite and/or prevent storage of the digitization platform metadata 132. In some embodiments, the distinct metadata fields 176 may be referred to as surrogate metadata fields. In some embodiments, the distinct metadata fields 176 may each correspond to a metadata tag, such as one or more instances of a native original capture tag 177. Instances of the native original capture tag 177 can be configured to describe a corresponding instance of the distinct metadata fields 176 and represent or otherwise provide one or more items of information that could be associated with the native original metadata 122. For example, instances of the native original capture tag 177 can indicate that a metadata field of the surrogate metadata 175 provides one or more of a GPS coordinate (e.g., latitude, longitude, altitude, etc.) of where the original capture device 120 was located within the historic environment 114 and/or of where the physical object 112' was located within the historic environment 114, an image direction (e.g., a direction which the original capture device 120 captured the physical object 112' within the historic environment 114), a subject, a headline, identities of people shown, and/or keyword that are specific to the original capture content 124, the original capture device 120, the physical object 112', and/or the historic environment 114. An illustrated example is provided and discussed below with respect to FIG. 2. In various embodiments, the surrogate metadata 175 can provide and/or otherwise enable searching and discovery of the physical object 112' that was captured by the original capture device 120 and is not represented by and included in the archived digital content 130, and therefore allow for detection of associations of images that otherwise were not readily searchable due to the lack of native original metadata 122.

In some embodiments, the surrogate metadata 175 may be generated based on instances of the digitally captured content 160 from one or more user equipment, such as the UE 102 and/or the community devices 144. In various embodiments, instances of the surrogate metadata 175 can include information that is obtained, extracted, and/or reproduced from the native metadata 162 of one or more instances of the digitally captured content 160. In some embodiments, the CAA 172 can determine and identify which of the native fields 164 are available and/or should be considered and/or used for the creation of the surrogate metadata 175. For example, in some embodiments, the CAA 172 can identify which of the tags 166 from the native metadata 162 of the digitally captured content 160 are marked as considered surrogate importable, which can be indicated by the presence of a surrogate importable flag 168. When an instance of the native field 164, the tag 166, and/or the native metadata 162 is associated with an instance of the surrogate importable flag 168, then information which represents or otherwise provides the native metadata 162 corresponding to the instance of the native field 164 and/or the tag 166 may be considered surrogate importable, and therefore can be used, analyzed, imported, and/or reproduced for the assembly of the surrogate metadata 175. In some embodiments, the surrogate importable flag 168 can be configured as an integer value, a character indicating yes or no (e.g., "Y" or "N"), or another indication as to whether information from the native metadata 162 can be imported and/or reproduced for use in the surrogate metadata 175.

In various embodiments, the surrogate metadata 175 can be assembled based on aggregating one or more instances of the native metadata 162 from one or more instances of the digitally captured content 160. In some embodiments, the surrogate metadata 175 can be assembled based on one or mroe instances of the native metadata 162 that are associated with the native fields 164 and/or the tags 166 that are marked or otherwise indicated as being surrogate importable (e.g., based on the presence of an instance of the surrogate importable flag 168). In some embodiments, information that is used to assemble and create the surrogate metadata 175 may be obtained from one or more than one device, such as the UE 102 and/or the community devices 144. Therefore, in some embodiments, an instance of an equipment identifier (e.g., the UE identifier 108) may be included in and/or associated with the surrogate metadata 175 (e.g., where the UE identifier 108 is associated with a particular instance of the distinct metadata fields 176 and/or the native original capture tag 177).

In various embodiments, the CAA 172 can embed the surrogate metadata 175 within the archived digital content 130. For example, in some embodiments, instances of the distinct metadata fields 176 can be instantiated within the archived digital content 130, where the distinct metadata fields 176 are separate and distinct from the existing metadata fields 134. By this, the digitization platform metadata 132 can be stored, preserved, and retained within the existing metadata fields 134, and the surrogate metadata 175 can be store and provided by the distinct metadata fields 176. Therefore, the surrogate metadata 175 can be embedded within the archived digital content 130 without populating the existing metadata fields 134, and in turn preventing any of the digitization platform metadata 132 from being overwritten. In some embodiments, the surrogate metadata 175 may be embedded or otherwise included within a copy of the archived digital content 130, such as within archived digital content 136. In some embodiments, this may enable the CAA 172 to preserve the state of the archived digital content 130. In some embodiments, the CAA 172 may not have authorization to edit or otherwise reconfigure the archived digital content 130 while within the digital data store 140, and therefore the archived digital content 136 can be created so that surrogate metadata 175 can be added. Therefore, it is understood that any discussion with respect to the archived digital content 130 and/or the first visual content 152 may also pertain to the archived digital content 136. Therefore, in some embodiments, the archived digital content 130 and/or the archived digital content 136 may be embedded with an instance of the surrogate metadata 175. As such, in some embodiments, if the first visual content 152 corresponds with the archived digital content 130, and the archived digital content 130 is reconfigured so as to be embedded with the surrogate metadata 175, then in some embodiments, the archived digital content 130 is transformed into the archived digital content 136 that includes the surrogate metadata 175, and in turn, the first visual content 152 may be referred to as having, including, and/or otherwise be embedded with, the surrogate metadata 175. In some embodiments, any instance of visual content (e.g., the archived digital content 130, the community captured content 146, and/or the digitally captured content 160) may be embedded with an instance of the surrogate metadata 175 such that any existing metadata fields are not overwritten and/or populated, thus allowing the surrogate metadata 175 to be stored within instances of the distinct metadata fields 176 alongside any existing metadata, metadata fields, and/or metadata tags within visual content. It is understood that the examples provided are for illustration purposes only, and therefore should not be construed as limiting in any way.

In some embodiments, the operating environment 100 can include one or more instance of a content server, such as the AR content server 186. The AR content server 186 may facilitate and/or support a service and/or application associated with augmented reality applications. It is understood that, in some embodiments, an instance of a content server may be associated with applications and/or services that provide virtual reality, streaming video and/or audio, social media platforms, or any other platform and/or service that can handle and/or provide content to a user device, such as the UE 190. In some embodiments, one or more requesting device may launch and application and/or service that can present video and/or images that can transition between one or more views as configured by a content transition stream, such as content transition stream 194. The content transition stream 194 may be generated based on a request from a requesting device, such as the UE 190. For example, in some embodiments, the AR content server 186 and/or the CAA 172 may receive a request to provide an instance of the content transition stream 194, such as a content transition request 192. In some embodiments, the CAA 172 can aggregate and assemble two or more instances of digital content so as to provide the content transition stream 194. Instances of the content transition stream 194 may be unique and/or distinctly created to present transitions between a particular environment and/or physical object as provided by various instances of the digitally captured content 160 and/or the archived digital content 130. As such, in some embodiments, a user associated with the requesting device, such as user 191 associated with the UE 190, may indicate what the content transition stream 194 should generally include.

For example, in some embodiments, the CAA 172 may receive the content transition request 192, where the content transition request 192 may indicate or otherwise identify the physical object 112 from the current environment and/or the physical object 112' from the historic environment 114. The content transition request 192 may request that an instance of the content transition stream 194 be generated that provides and presents one or more views of the appearance of the physical object transitioning from the historic environment 114 to the current environment 110 (e.g., transitioning from the physical object 112' provided by the archived digital content 130 to the physical object 112 provided by the digitally captured content 160). The CAA 172 can identify instances of digital content that can be aggregated to fulfil the content transition request 192. For example, the CAA 172 may analyze the native metadata 162 from the digitally captured content 160 that presents the physical object 112 within the current environment 110. The CAA 172 can compare the information from the native metadata 162 of the digitally captured content 160 against instances of the surrogate metadata 175 from among various instances of the archived digital content 130 (and/or the archived digital content 136, in some embodiments). The CAA 172 can identify one or more instances of the archived digital content 130 that are associated with the digitally captured content 160 based on the surrogate metadata 175.

In various embodiments, the CAA 172 can determine or otherwise detect a view that would be presented on a user interface of the requesting device by the particular instance of the digital content (e.g., the digitally captured content 160 and/or the archived digital content 130). For example, an instance of the archived digital content 130 can present a historic view 182 of the physical object 112' within the historic environment 114. In some embodiments, one or more instances of digital content may exist or otherwise be associated with the historic view 183, and therefore each instance of the archived digital content 130 may provide a separate, unique instance of the historic view 182. In some embodiments, an instance of the historic view 182 may be associated with alternate views that capture a different, but associated, environment, such as any of views 184A-N. For example, in an embodiment, the UE 102 and two or more instances of the community devices 144 may have generated unique instances of the digitally captured content 160, where each of the instances provides and corresponds to a different one of the views. Each of the views 184A-N can provide a unique angle and/or image of the physical object 112 within the current environment 110. As such, presentation of the different instances of the digitally captured content 160 may present and transition between the views 184A-N.

In various embodiments, the CAA 172 can generate an instance of the content transition stream 194 based on aggregation of one or more instances of the digitally captured content 160 and the associated instance of the archived digital content 130. In various embodiments, the content transition stream 194 can present a video and/or motion graphic so as to enable the physical object 112' within the historic environment 114 presented in the historic view 182 to visually transition to the physical object 112 within the current environment 110, which may be provided by one of the views 184A-N. In some embodiments, the content transition stream 194 may include multiple instances of the digitally captured content 160 from various equipment and devices, such as the UE 102 and/or the community devices 144. For example, multiple instances of the digitally captured content 160 can correspond with one of the views 184A-N.

In some embodiments, the content transition stream 194 can include an instance of stitched transition data that provides instructions to the requesting device for presenting the various views, such as the historic view 182 and the views 184A-N. For example, the CAA 172 can create an instance of the stitched transition data 180 that can be included in the content transition stream 194 which is generated for the UE 190 based on the content transition request 192. The stitched transition data 180 can provide a data structure and/or image container which can store and provide an order of how the content transition stream 194 should present the various views to the requesting device, such as to the UE 190. For example, the CAA 172 can determine that the archived digital content 130 provides an instance of the historic view 182 of the physical object 133 within the historic environment 114. The CAA 172 can configure the stitched transition data 180 such that the archived digital content 130 is presented first. The CAA 172 may determine that views 184A-N are available from one or more instances of the digitally captured content 160 (which may be generated from the UE 102 and/or any of the community devices 144). Therefore, stitched transition data 180 can be configured so as to enable the historic view 182 to transition to one or more of the views 184A-N. In some embodiments, the stitched transition data 180 can enable the content transition stream 194 to present the physical object 112 within the current environment 110 from various angles, such as provided by one or more of the views 184A-N. The stitched transition data 180 may provide and identify which of the views 184A-N to include based on instances of the surrogate metadata 175 that can be associated with various instances of the digitally captured content 160. In various embodiments, the stitched transition data 180 can be packetized and provided to the requesting device within the content transition stream 194. The stitched transition data 180 can be configured so as to enable a user (e.g., the user 191) to transition back and forth between one or more view of a particular scene (e.g., any of the views 184A-N and/or the historic view 182 that may capture and/or represent one or more angles and/or unique instances of the first scene 151 and/or the second scene 154). In some embodiments, the aggregation server 170 may instruct a content server (e.g., the AR content server 186) to relay and/or provide access to one or more instances of visual content that will be used for creation and/or delivery of the content transition stream 194. For example, the CAA 172 may identify that the first visual content 152 and the second visual content 155 are to be included and stitched together into multiple views, such as by generation of the stitched transition data 180. The aggregation server 170 may prepare the content transition stream 194 for the AR content server 186, and instruct the AR content server 186 to provide the content transition stream 194 to the requesting device (e.g., the UE 190) on behalf of the aggregation server 170. It is understood that the examples provided are for illustration purposes only, and therefore should not be construed as limiting in any way.

In some embodiments, one instance of visual content may be identified, detected, and/or retrieved based on the surrogate metadata 175. In some embodiments, a requesting device (e.g., the UE 190) can send and/or provide a content search request 195. In some embodiments, the CAA 172 (and/or one or more network devices, such as the aggregation server 170 and/or the AR content server 186) can receive the content search request 195. In some embodiments, the content search request 195 may include an instance of visual content (e.g., the second visual content 155 that includes or is otherwise configured as an instance of the digitally captured content 160). In some embodiments, the CAA 172 may extract native metadata (e.g., an instance of the native metadata 162) from the second visual content 155. In some embodiments, the CAA 172 may search one or more data store (e.g., the community data store 142 and/or the digital data store 140) and analyze instances of surrogate metadata (e.g., the surrogate metadata 175) which match the native metadata 162. In some embodiments, the CAA 172 may identify an instance of the surrogate metadata 175 that has been embedded (e.g., according to one or more operations of the CAA 172 discussed above) in an instance of the first visual content 152 (e.g., an instance of the archived digital content 136 that has been embedded with the surrogate metadata 175) based on the native metadata 162 from the second visual content 155 (e.g., from an instance of the digitally captured content 160). In some embodiments, one or more instances of the native metadata 162 within the second visual content 155 may match one or more instances of the surrogate metadata 175 within the distinct metadata fields 176 of the first visual content 152 (e.g., which can correspond to an instance of the archived digital content 136 and/or the archived digital content 130 that has embedded an instance of the surrogate metadata 175). In some embodiments, the operations can include retrieving an instance of the first visual content 152 based on the surrogate metadata 175. In some embodiments, the CAA 172 can generate a content search response 196 that includes instances of visual content that were identified based on the surrogate metadata 175, such as the first visual content 152 that has been embedded with the surrogate metadata 175. The content search response 196 can be provided to a requesting device, such as the UE 190.

As illustrated in FIG. 1, the aggregation server 170, the AR content server 186, the UE 102, the UE 190, the community devices 144, the community data store 142, and/or the digital data store 140 can communicate with each other directly and/or via an indirect communication path, such as via the network 150, although this may not necessarily be the case. In some embodiments, one or more instances of the aggregation server 170, the AR content server 186, the UE 102, the UE 190, the community devices 144, the community data store 142, and/or the digital data store 140 may be located, hosted, or otherwise supported by the network 150, although this may not necessarily be the case. In some embodiments, the network 150 can include and support one or more of an evolved universal mobile telecommunications system ("UMTS"), a terrestrial radio access ("E-UTRAN"), a serving/PDN gateway ("S/PGW"), a home subscriber server ("HSS"), an access and mobility function ("AMF"), a session management function—user plane function ("SMF-UPF"), unified data management ("UDM"), an application server, an application function ("AF"), an enhanced mobile broadband system ("eMBBS"), a mobile edge computing ("MEC") unit, a combination thereof, and/or any other systems, devices, and/or functions that may be included in 2G, 3G, 4G, 5G, or later communication architecture. In some embodiments, the network 150 can include a network access point that facilitates or otherwise supports communicative coupling within the operating environment. Examples of a network access point can include, but should not be limited to, one or more of a base transceiver station, a wireless router, a femtocell, an Node B, an eNodeB, a gNodeB (i.e., an access point that incorporates New Radio access technology, such as LTE Advanced, and other 5G technology), a multi-standard metro cell node, an optical network terminal, and/or other network nodes or combinations thereof. It should be understood that the examples provided are for illustration purposes only, and therefore should not be construed as limiting in any way.

FIG. 1 illustrates the operating environment 100 having one or more instance of the UE 102, the acquisition device 104, the capture application 106, the UE identifier 108, the user 103, the physical object 112, the background object 111, the current environment 110, the physical object 112', the historic environment 114, the original capture device 120, the native original metadata 122, the original capture content 124, the digitization platform 126, the archived digital content 130, the digitization platform metadata 132, the existing metadata fields 134, the digital data store 140, the community data store 142, the network 150, the first scene 151, the first visual content 152, the image features 153, the second scene 154, the second visual content 155, the image features 156, the shared image feature amount 158, the shared feature threshold 159, the digitally captured content 160, the native metadata 162, the native field 164, the tags 166, the surrogate importable flag 168, the aggregation server 170, the CAA 172, the image recognition tool 206, the null pointer message 173, the null pointer exception 174, the archived digital content 136, the surrogate metadata 175, the distinct metadata fields 176, the native original capture tags 177, the stitched transition data 180, the historic view 182, the views 184A-N, the AR content server 186, the UE 190, the user 191, the content transition request 192, the content transition stream 194, the content search request 195, and/or the content search response 196. It should be understood, however, that some implementations of the operating environment 100 can include zero, one, or more than one instances of the above listed elements of the operating environment 100 shown in FIG. 1. As such, the illustrated embodiment of the operating environment 100 is understood to be illustrative and should not be construed as being limiting in any way.

Figure 2:
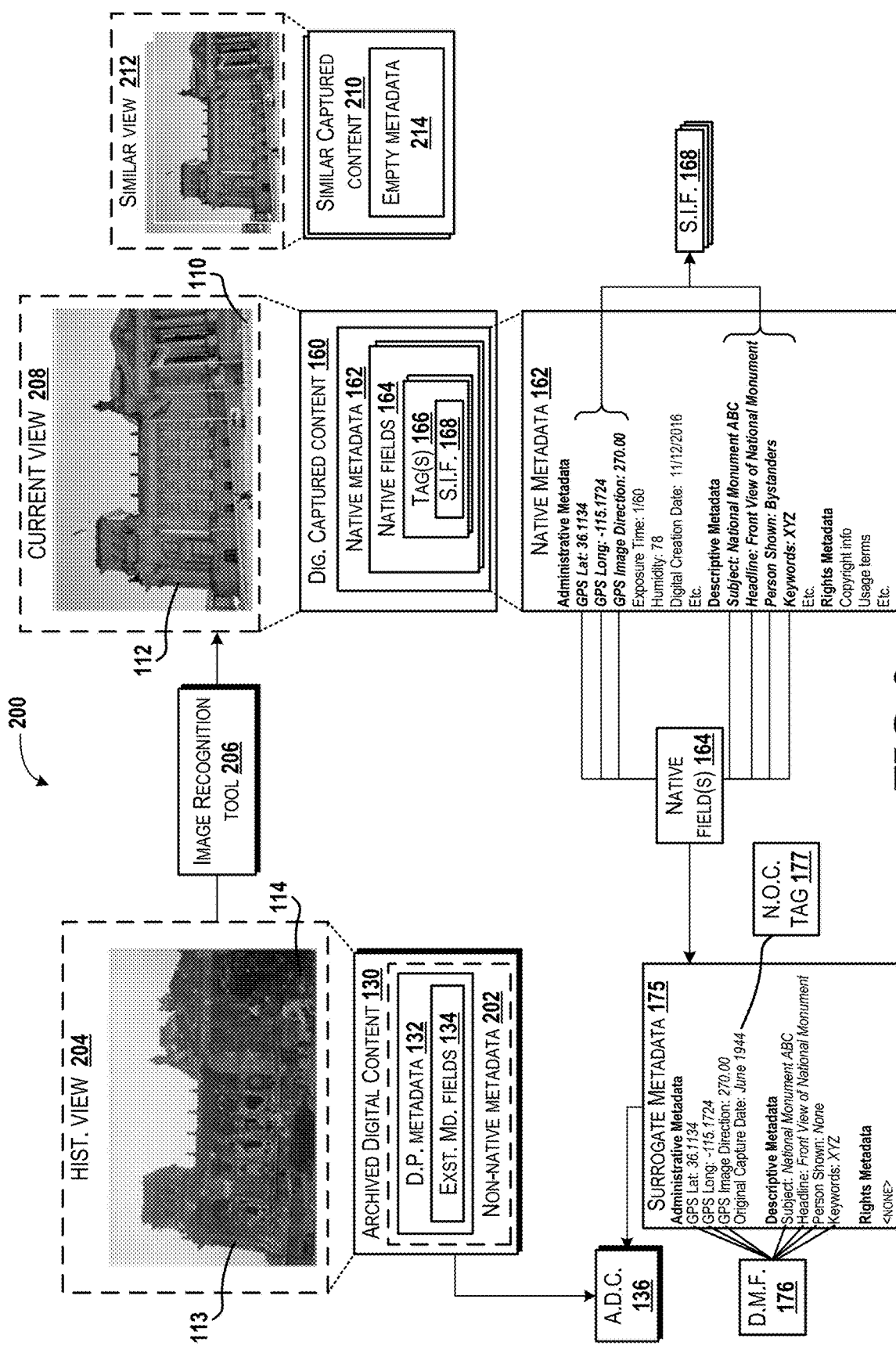
FIG. 2 is a block diagram illustrating aspects of providing surrogate metadata aggregation, according to various embodiments disclosed herein.

Turning now to FIG. 2 with continued reference to FIG. 1, a block diagram 200 illustrating aspects of providing surrogate metadata aggregation will be described, according to an illustrative embodiment. As illustrated in FIG. 2, an instance of the archived digital content 130 may provide a historic view 204 that presents the physical object 112' within the historic environment 114. The historic view 204 illustrated in FIG. 2 can correspond with an embodiment of the historic view 182 discussed with respect to FIG. 1. An instance of the archived digital content 130 may include non-native metadata 202 that is generated by the digitization platform 126 and therefore pertains and includes information that is not native to the original capture device 120, the physical object 112', the historic environment 114, the native original metadata 122, and/or the original capture content 124. As such, the non-native metadata 202 can include the digitization platform metadata 132 and the existing metadata fields 134. The non-native metadata 202 does not include the native original metadata 122.

In various embodiments, the image recognition tool 206 may be invoked or otherwise executed to provide image recognition and facilitate feature extraction from the historic view 204. The image recognition tool 206 may identify an instance of the digitally captured content 160 that present a current view 208 that includes the physical object 112 within the current environment 110. In some embodiments, the image recognition tool 206 may identify an another instance of digital content, such as similar captured content 210 that presents a similar view 212 compared the current view 208; however, the similar captured content 210 may lack any native metadata, as illustrated by empty metadata 214. As such, the similar captured content 210 may not be used to facilitate the generation of surrogate metadata.

As illustrated in FIG. 2, the image recognition tool 206 and/or the CAA 172 may analyze the digitally captured content 160 that presents the current view 208. Specifically, the CAA 172 may analyze one or more of the native metadata 162, instances of the native field 164, the tags 166, and/or the surrogate importable flag 168. In an embodiment illustrated in FIG. 2, an instance of the native metadata 162 may include administrative metadata, descriptive metadata, and/or rights metadata that was generated by a device, such as the UE 102. In some embodiments, one or more instances of native fields 164 can indicate, correspond to and/or be associated with an instance of the surrogate importable flag 168. For example, as illustrated in FIG. 2, three instances of the native field 164 from the administration metadata portion of the native metadata 162 are marked as surrogate importable based on being associated with, or otherwise pointing to the surrogate importable flag 168. Additionally, four instances of the native field 164 from the descriptive metadata portion of the native metadata 162 are marked as surrogate importable based on being associated with, or otherwise pointing to the surrogate importable flag 168.

Therefore, in various embodiments, the CAA 172 can generate an instance of the surrogate metadata 175 for the archived digital content 130 (that provides the historic view 204) based on the native metadata 162. Specifically, the instances of the native field 164 from the native metadata 162 that were associated with the surrogate importable flag 168 may be independently instantiated or otherwise generated as instances of the distinct metadata fields 176. Each of the distinct metadata fields 176 may be associated with or otherwise provide an instance of the native original capture tag 177, which in turn may be based on instances of the tag 166 from the native fields 164 of the native metadata 162. The distinct metadata fields 176 can be populated with information from the native metadata 162 of the digitally captured content 160. The distinct metadata fields 176 may be embedded within the archived digital content 130 and/or within a copy of the archived digital content 130, such as the archived digital content 136. It is understood that the examples provided are for illustration purposes only, and therefore should not be construed as limiting in any way.

Turning now to FIGS. 3A-C and 4 with continued references to FIGS. 1 and 2, aspects of a method 300, a method 350, a method 370, and a method 400 will be described in detail, according to various illustrative embodiments. It should be understood that each of the operations of the one or more methods disclosed herein (e.g., the method 300, the method 350, the method 370, and/or the method 400 discussed below) are not necessarily presented in any particular order and that performance of some or all of the operations in an alternate order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The phrases "computer executable instructions," and variants thereof (e.g., "computer-readable instructions"), as used herein, is used expansively to include routines, applications, modules, scripts, programs, plug-ins, data structures, algorithms, and the like. It is understood that any use of the term "module" (in the specification and claims) refers to a defined, callable set of computer-readable and executable instructions that, upon execution by a processor, configure at least a processor to perform at least a portion of one or more operations and functions discussed herein so as to transform, upon execution, processing resources and/or memory resources into a particular, non-generic, machine. Computer-readable instructions can be implemented on various system configurations including but not limited to one or more of single-processor or multiprocessor systems, minicomputers, user equipment, mainframe computers, personal computers, network servers, hand-held computing devices, microprocessor-based, programmable consumer electronics, a network platform, edge devices, vehicles, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system so as to provide a particular, non-generic machine device. The implementation is a matter of choice dependent on the performance and other requirements of the computing system. Accordingly, the logical operations described herein are referred to variously as states, operations, structural devices, acts, functions, instructions, and/or modules. These states, operations, structural devices, acts, functions, instructions, and/or modules may be implemented in software, in firmware, in special purpose digital logic, and any combination thereof. As used herein, the phrase "cause a processor to perform operations" and variants thereof is used to refer to causing and transforming a processor of a computing system or device, such as any component within one or more of the UE 102, the community devices 144, the aggregation server 170, the AR content server 186, and/or the UE 190, to perform one or more operations and/or causing one or more instances of a processor to direct other components of a computing system or device, to perform one or more of the operations.

Figure 6:
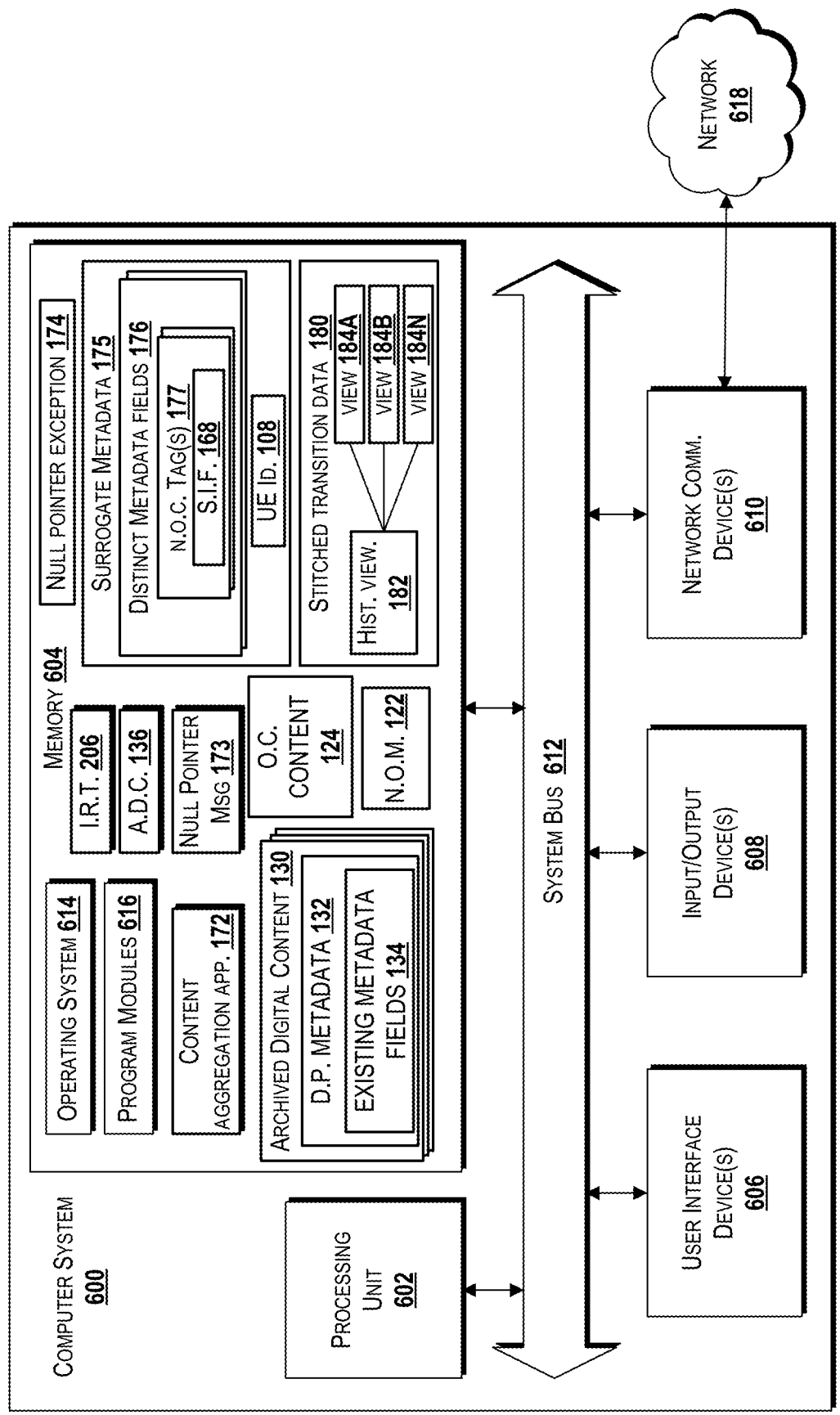
FIG. 6 is a block diagram illustrating an example computer system capable of implementing aspects of the embodiments presented and described herein.

For purposes of illustrating and describing the concepts of the present disclosure, one or more of the operations of methods disclosed herein are described as being performed by one or more instance of a system, such as the aggregation server 170 and/or the AR content server 186 via execution of one or more computer-readable instructions configured so as to instruct and transform a processor, such as via execution of the CAA 172 that can configure a processor (e.g., a processing unit discussed with respect to FIG. 6). In some embodiments, one or more operations of may be performed by one or more instance of a network server. Examples of a network server can include, but should not be limited to, the aggregation server 170, the AR content server 186, an instance of the computer system discussed with respect to FIG. 6, or the like. In some embodiments, one or more operations may be performed by one or more of the UE 102, the community devices 144, and/or the UE 190. It should be understood that additional and/or alternative devices and/or network infrastructure devices can, in some embodiments, provide the functionality described herein via execution of one or more routines, applications, and/or other software including, but not limited to, the CAA 172, the capture application 106, and/or any other computer executable instructions that can configure a device discussed herein, such as but not limited to one or more of the aggregation server 170 and/or the AR content server 186. Thus, the illustrated embodiments are illustrative, and should not be viewed as being limiting in any way. It should be understood that the examples provided are for illustration purposes only, and therefore should not be construed as limiting in any way. The method 300, the method 350, the method 370, and the method 400 will be described with reference to one or more of the FIGS. 1, 2, 3A, 3B, 3C, and 4.

Figure 3A:
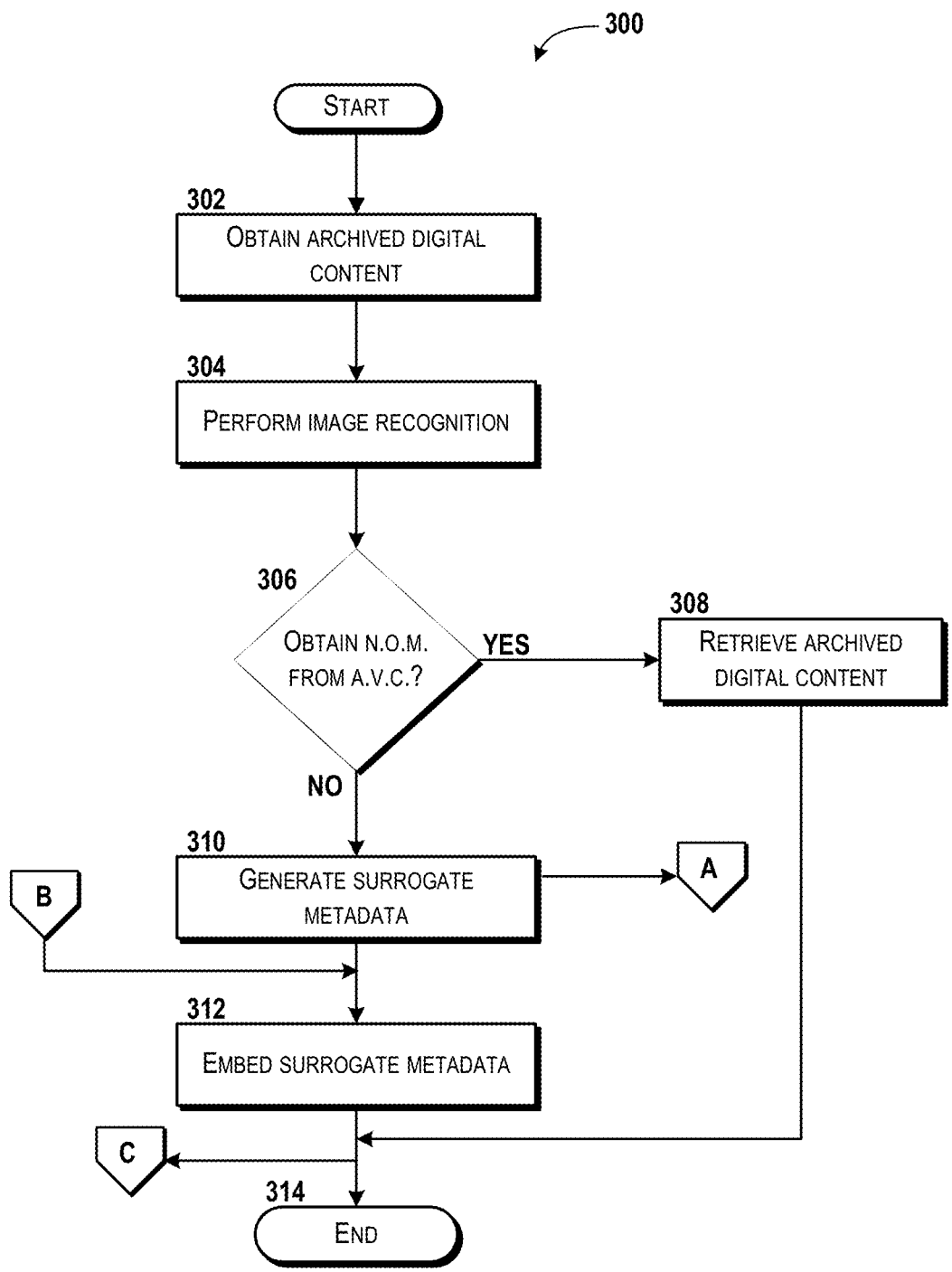
FIG. 3A provides a flow diagram illustrating aspects of a method for surrogate metadata aggregation for dynamic content assembly, according to an illustrative embodiment.

Turning now to FIG. 3A, the method 300 for surrogate metadata aggregation for dynamic content assembly is disclosed, according to an illustrative embodiment. In some embodiments, one or more operations of the method 300 can be implemented by the CAA 172 executing on one or more instances of the aggregation server 170. The method 300 can begin and proceed to operation 302, where the CAA 172 can obtain an instance of visual content from the digital data store 140, such as the first visual content 152 that can correspond with an instance of the archived digital content 130. In various embodiments, the archived digital content 130 can digitally present a physical object within a historic environment, such as a historic view 182 of the physical object 112' within the historic environment 114. In some embodiments, one or more instances of the archived digital content 130 may be stored in the digital data store 140 by the digitization platform 126. In some embodiments, the digitization platform 126 can transform, capture, copy, or otherwise reproduce an image from the original capture content 124 in the archived digital content 130, where the original capture content 124 can depict the historic environment 114 and the physical object 112' according to the historic view 182.

From operation 302, the method 300 can proceed to operation 304, where the CAA 172 can perform image recognition on the archived digital content 130 so as to correlate the archived digital content 130 with digitally captured content 160. By this, the historic view 182 of the physical object 112' within the historic environment 114 can be associated with the particular view (e.g., any of the views 184A-N) by the digitally captured content 160 that presents the physical object 112 within the current environment 110.

From operation 304, the method 300 can proceed to operation 306, where the CAA 172 can determine whether the native original metadata 122 can be obtained from the archived digital content 130. The native original metadata can be associated with information about the physical object 133 as presented within the historic environment 114. In some embodiments, the digitization platform 126 fails to generate metadata fields (separate from the existing metadata fields 134 for the digitization platform metadata 132) to enable the storage of the native original metadata 122 in the archived digital content 130. As such, the native original metadata 122 may not be included in the archived digital content 130. Therefore, in some embodiments, the CAA 172 may determine that the native original metadata 122 cannot be obtained from the archived digital content 130. In some embodiments, one or more aspects and/or operations discussed with respect to FIG. 3C may be included to facilitate the determination that the native original metadata 122 cannot be obtained from the archived digital content 130. If the CAA 172 determines that an instance of the native original metadata 122 cannot be obtained from the archived digital content 130, then the method 300 may proceed along the NO path from operation 306 to operation 310, which is discussed below in further detail. In some embodiments, if the CAA 172 determines that an instance of the native original metadata 122 can be obtained from the archived digital content 130, then the method 300 may proceed along the YES path from operation 306 to operation 308. For clarity, a discussion of operation 308 will be provided first, followed by a discussion of operation 310.

At operation 308, the CAA 172 can retrieve the visual content, such as the archived digital content 130. In some embodiments, from operation 308, the method 300 may proceed to one or more operation discussed with respect to FIG. 4. In some embodiments, from operation 308, the method 300 may proceed to one or more operation 314, where the method 300 may end.

At operation 310, the method 300 can include generating one or more instances of the surrogate metadata 175 for the archived digital content 130 based on the digitally captured content 160. In some embodiments, generating the surrogate metadata 175 can include one or more operations, which are discussed in further detail with respect to FIGS. 3B and/or 3C. Therefore, in some embodiments, the method 300 may include one or more operations discussed with respect to FIGS. 3B and/or 3C.

From operation 310, the method 300 may proceed to operation 312, where the CAA 172 may embed one or more instance of the surrogate metadata 175 within the archived digital content 130. In some embodiments, embedding the surrogate metadata 175 may include instantiating one or more of the distinct metadata fields 176 within the archived digital content 130. In some embodiments, the distinct metadata fields 176 can be used to provide information about the historic environment 114 as depicted in the historic view 182 by the archived digital content 130. In some embodiments, the surrogate metadata 175 is embedded within the archived digital content 130 without populating one or more of the existing metadata fields 134 provided by the archived digital content 130.

From operation 312, the method 300 may proceed to operation 314, where the method 300 may end. It should be understood that the examples provided are for illustration purposes only, and therefore should not be construed as limiting in any way.

Figure 3B:
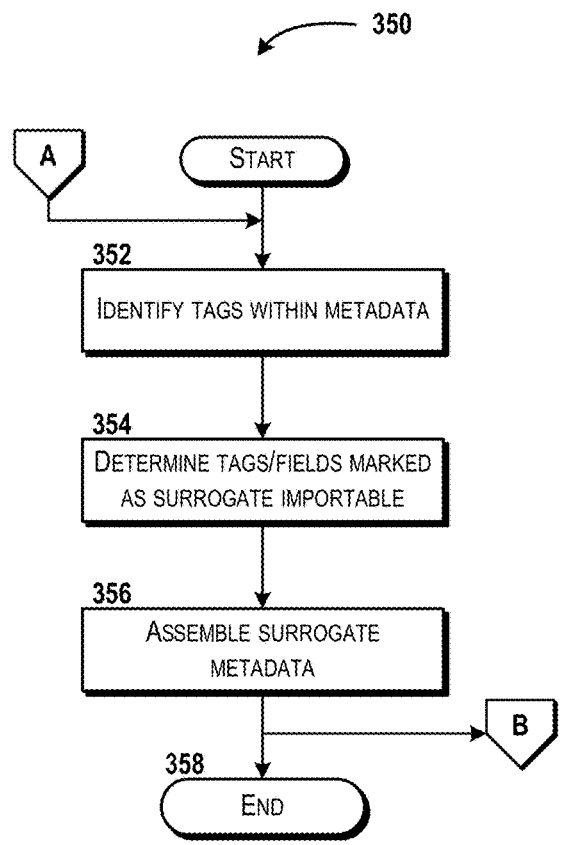
FIG. 3B provides a flow diagram illustrating aspects of a process for generating surrogate metadata for dynamic content assembly, according to an illustrative embodiment.

Turning now to FIG. 3B, the method 350 for aspects of a process for generating surrogate metadata for dynamic content assembly is disclosed, according to an illustrative embodiment. In some embodiments, one or more operations of the method 300 can be implemented by the CAA 172 executing on one or more instances of the aggregation server 170. In various embodiments, the method 350 may support or otherwise facilitate generating one or more instances of the surrogate metadata 175 that may be embedded or otherwise used for an instance of archived digital content (e.g., the archived digital content 130 and/or the archived digital content 136). The method 350 can begin and proceed to operation 352, where the CAA 172 can identify one or more instances of the tags 166 within native metadata 162 of the digitally captured content 160 (which is determined to be associated with the archived digital content 130).

From operation 352, the method 350 may proceed to operation 354, where the CAA 172 can detect or otherwise determine which of the tags 166 within the native metadata 162 are marked as surrogate importable, such as by determining which of the tags 166 correspond to an instance of the surrogate importable flag 168.

From operation 354, the method 350 may proceed to operation 356, where the CAA 172 can assemble the surrogate metadata 175 based on the tags 166 that are marked as surrogate importable. For example, the CAA 172 can analyze, extract, reproduce, migrate, and/or mimic the native fields 164 that have instances of the tag 166 that correspond to the surrogate importable flag 168, and in turn can create instances of the native original capture tag 177 and the distinct metadata fields 176 for the surrogate metadata 175. In some embodiments, the method 350 may proceed from operation 356 to one or more operations discussed with respect to FIG. 3A.

In some embodiments, from operation 356, the method 350 may proceed to operation 358, where the method 350 may end.

Figure 3C:
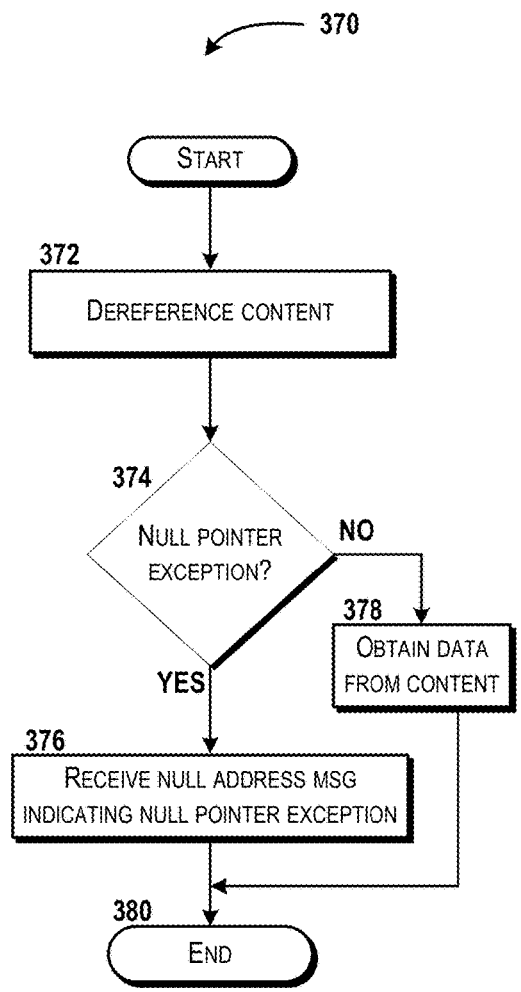
FIG. 3C provides a flow diagram illustrating aspects of a process for implementing surrogate metadata aggregation, according to an illustrative embodiment.

Turning now to FIG. 3C, a method 370 for detecting native original metadata within archived digital content is provided to facilitate implementing aspects of surrogate metadata aggregation, according to an illustrated embodiment. In some embodiments, one or more operations of the method 370 can be implemented in another method discussed herein. The method 370 can begin and proceed to operation 372, where the CAA 172 can dereference an instance of visual content, such as the archived digital content 130 and/or the archived digital content 136 (which may correspond with the first visual content 152). In some embodiments, the digital data store 140 and/or the aggregation server 170 may provide a pointer that is designated or otherwise reserved for instances of the native original metadata 122 within an instance of the archived digital content 130.

From operation 372, the method 370 may proceed to operation 374, where the CAA 172 can determine whether an instance of the null pointer exception 174 is detected. In some embodiments, detection of the null pointer exception 174 can allow the CAA 172 to determine whether the native original metadata 122 can be obtained from an instance of visual content, such as from the first visual content 152 that can correspond to the archived digital content 130. If a null pointer exception 174 is determined to exist, then the native original metadata 122 may not exist and/or otherwise be obtained from the visual content. For example, the CAA 172 can dereference the archived digital content 130 to detect for the native original metadata 122, which may include dereferencing a pointer so as to attempt to access a memory location where the native original metadata 122 should be stored. In some embodiments, dereferencing the archived digital content 130 may include detecting whether the native original metadata 122 could be stored (or is stored) in the archived digital content 130 by dereferencing a pointer.

In an embodiment, the CAA 172 may determine that a null pointer exception 178 does not exist in response to dereferencing visual content. In some embodiments, the null pointer exception 178 may not exist because the visual content includes native original metadata 122 (e.g., an instance of the archived digital content 130 may include (and/or have access to) the native original metadata 122). In other embodiments, the visual content (e.g., the first visual content 152) may have been reconfigured and embedded with the surrogate metadata 175, which may reconfigure a pointer so as to point to the surrogate metadata 175, which in turn can remove the null pointer and cause the null pointer exception 178 to no longer exist. Therefore, if the CAA 172 determines that the null pointer exception 178 does not exist for a particular instance of visual content, then the method 370 may proceed along the NO path. In some embodiments, the method 370 may proceed along the NO path to one or more operations discussed herein. In some embodiments, the method 370 may proceed along the NO path from operation 374 to operation 378, where the CAA 172 can obtain the native original metadata 122. In some embodiments, the method 370 may proceed from operation 378 to operation 380, where the method 370 may end.

Returning to operation 374, in some embodiments, the CAA 172 may determine that the dereferencing yields an instance of the null pointer exception 174 because the native original metadata 122 is not stored, not included, or otherwise cannot be obtained from the archived digital content 130. The archived digital content 130 may lack separate metadata fields specific to (i.e., lack metadata fields specifically reserved for) the native original metadata 122, and therefore the dereferencing can cause the CAA 172 to determine that a pointer under analysis is a null pointer, which in turn can trigger or otherwise cause the null pointer exception 174. Stated differently, in some embodiments, the null pointer exception 174 can result from the archived digital content 130 not having (i.e., not containing) metadata fields to store the native original metadata 122 independent and separate from the existing metadata fields 134 for the digitization platform metadata 132. In various embodiments, if an instance of the null pointer exception 174 is detected, then the method 370 may proceed along the YES path from operation 374 to operation 376.

At operation 376, the CAA 172 may receive an instance of the null pointer message 173 that indicates and/or confirms the existence and/or presence of the null pointer exception 174, which in turn enables the CAA 172 to determine that the native original metadata 122 is not included in, and cannot be obtained from, the archived digital content 130. From operation 376, the method 370 may proceed to operation 380, where the method 370 may end.

Figure 4:
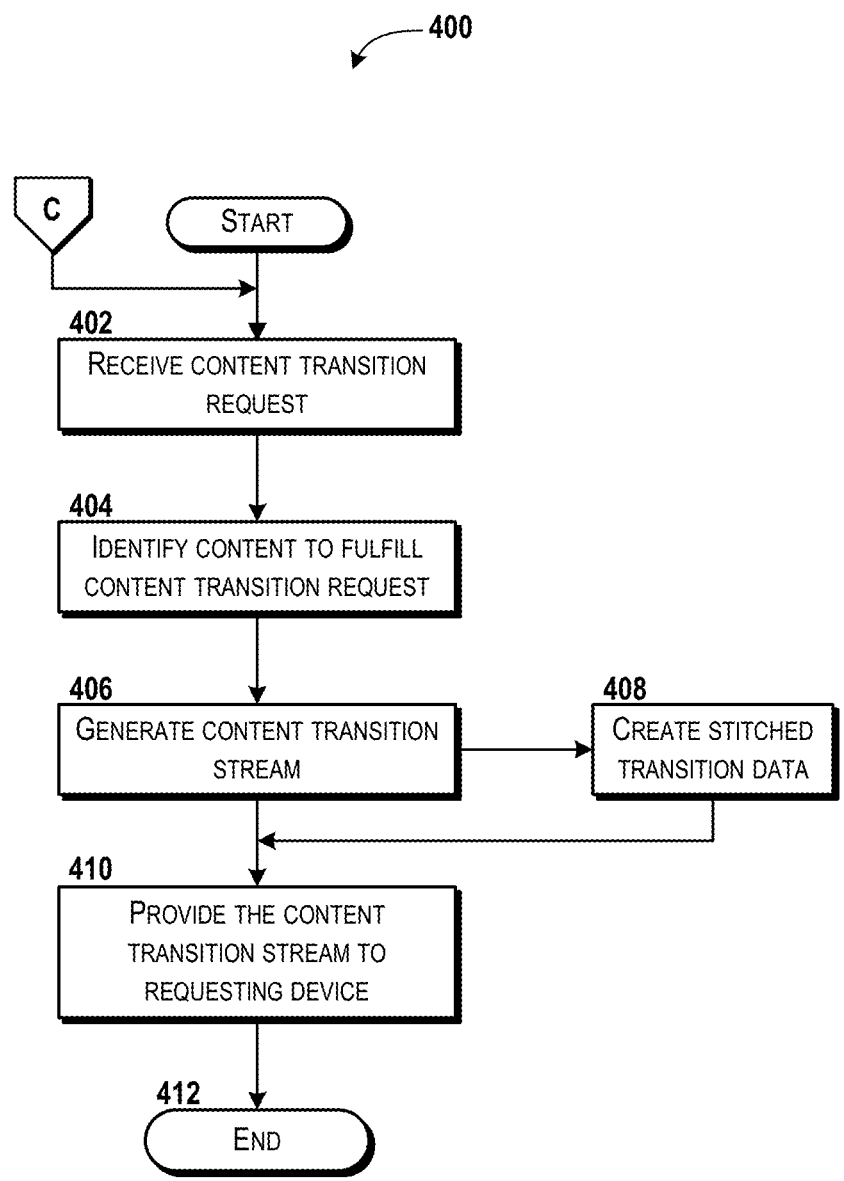
FIG. 4 is a flow diagram illustrating aspects of a method for providing dynamic content assembly using surrogate metadata, according to an illustrative embodiment.

Turning now to FIG. 4, the method 400 for providing dynamic content assembly using surrogate metadata is disclosed, according to an illustrative embodiment. In various embodiments, one or more operations discussed herein may be performed by the CAA 172 executing on one or more instances of the aggregation server 170 and/or the AR content server 186.

In some embodiments, one or more operations of the method 400 can begin at operation 402, where the CAA 172 may receive an instance of the content transition request 192, which may indicate or otherwise identify the physical object 112 from the current environment and/or the physical object 112' from the historic environment 114. The content transition request 192 may request that an instance of the content transition stream 194 be generated that provides and presents one or more views of the appearance of the physical object transitioning from the historic environment 114 to the current environment 110 (e.g., transitioning from the physical object 112' provided by the archived digital content 130 to the physical object 112 provided by the digitally captured content 160).

From operation 402, the method 400 may proceed to operation 404, where the CAA 172 can identify digital content that can be aggregated to fulfil the content transition request 192. For example, the CAA 172 may analyze the native metadata 162 and compare the information against instances of the surrogate metadata 175 from among various instances of the archived digital content 130. The CAA 172 can identify the instance of the archived digital content 130 that is associated with the digitally captured content 160 based on the surrogate metadata 175.

From operation 404, the method 400 may proceed to operation 406, where the CAA 172 can generate the content transition stream 194 based on aggregation of the digitally captured content 160 and the associated instance of the archived digital content 130. In various embodiments, the content transition stream 194 can present a video and/or motion graphic so as to present the physical object 112' within the historic environment 114 transitioning to the physical object 112 within the current environment 110. In some embodiments, the content transition stream 194 may include multiple instances of the digitally captured content 160 from various equipment and devices, such as the UE 102 and/or the community devices 144.

In some embodiments, from operation 406, the method 400 may proceed to operation 410, which will be discussed below in further detail. In some embodiments, from operation 406, the method 400 may proceed to operation 408, where the CAA 172 can create an instance of the stitched transition data 180 that can be included in the content transition stream 194. The stitched transition data 180 can provide a data structure and/or image container which can store and provide an order of how the content transition stream 194 should be presented to the requesting device, such as the UE 190. For example, the CAA 172 can determine that the archived digital content 130 provides an instance of the historic view 182 of the physical object 133 within the historic environment 114. The CAA 172 can configure the stitched transition data 180 such that the archived digital content 130 is presented first. The CAA 172 may determine that views 184A-N are available from one or more instances of the digitally captured content 160, and therefore can configure the stitched transition data 180 so as to enable the historic view 182 to transition to one or more of the views 184A-N. In some embodiments, the stitched transition data 180 can enable the content transition stream 194 to present the physical object 112 within the current environment 110 from various angles, such as provided by one or more of the views 184A-N.

From operation 408, the method 400 can proceed to operation 410, where the CAA 172 can provide the content transition stream 194 to the requesting device, such as the UE 190. In some embodiments, the content transition stream 194 can instruct or otherwise configure the UE 190 to provide a user interface that is configured by the stitched transition data 180 to present one or more views of the physical object 112 according to various views and/or within different environments, such as the historic view 182, the views 184A-N, the current environment 110 and/or the historic environment 114. In some embodiments, the content transition stream 194 may be provided to the UE 190 by way of a content server, such as the AR content server 186, and/or the network 150.

From operation 410, the method 400 may proceed to operation 412, where the method 400 may end.

Figure 5:
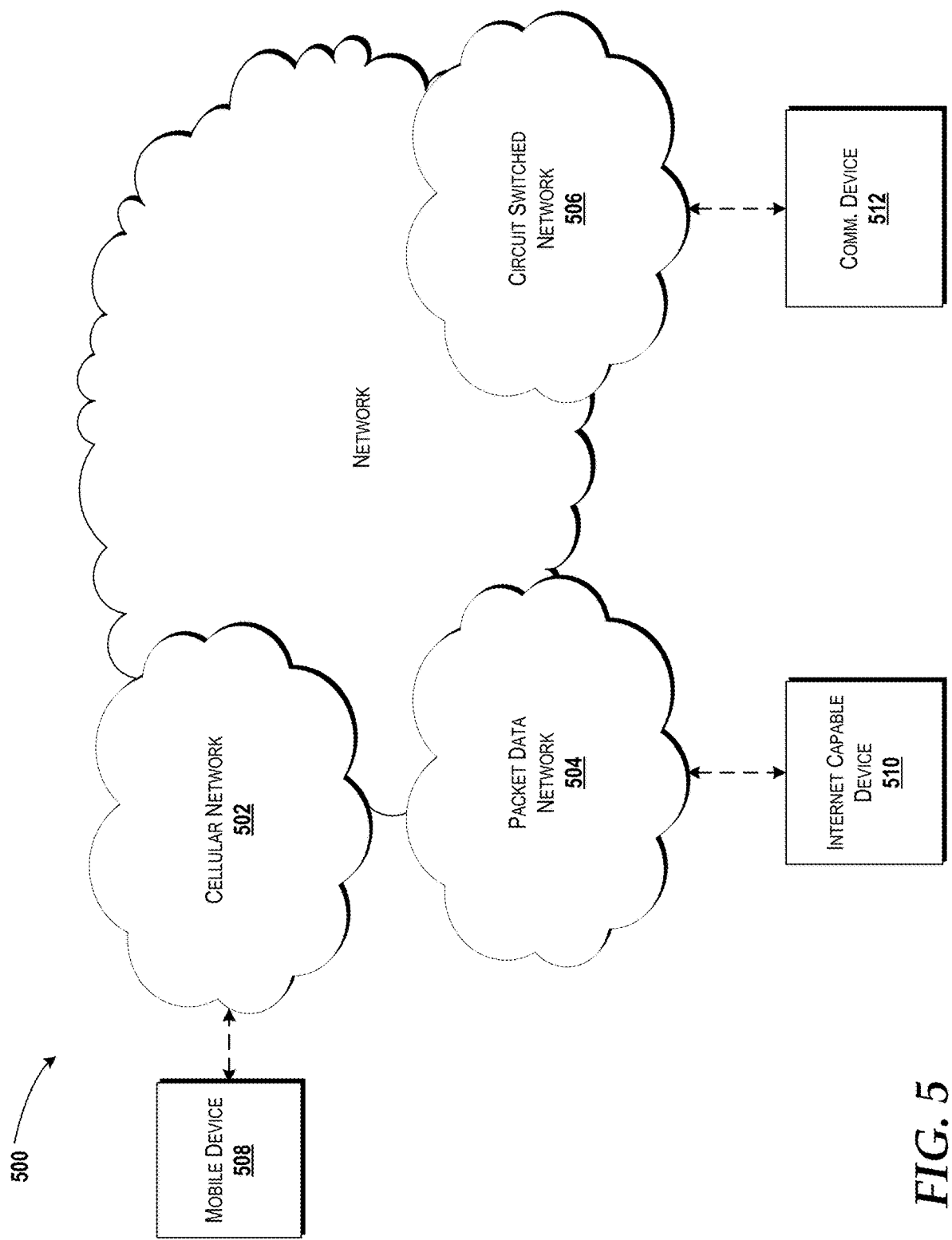
FIG. 5 is a diagram illustrating an example network capable of implementing aspects of the embodiments discussed herein.

Turning now to FIG. 5, a discussion of a network 500 is illustrated, according to an illustrative embodiment. In some embodiments, aspects of the network 150 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), node-B's ("NBs"), e-Node-B's ("eNBs"), g-Node-B's ("gNBs"), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), 5G core components, 5G New Radio ("NR") components, functions, applications, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with, and/or otherwise configured to implement and support, mobile communications standards such as but not limited to 4G, LTE, LTE Advanced, and/or 5G NR, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communication device 512 can correspond with one or more computer systems, devices, and/or equipment discussed with respect to FIG. 1, such as but not limited to the UE 102, the UE 190, the community devices 144, the original capture device 120, the aggregation server 170, and/or the AR content server 186. In the specification, the network 150 and/or the network 500 can refer broadly to, in some embodiments, any combination of the networks 502, 504, 506. It should be appreciated that substantially all of the functionality described with reference to the network 150 and/or the network 500 can, in some embodiments, be performed by the cellular network 502, the packet data network 504, and/or the circuit switched network 506, alone or in combination with other networks, network elements, and the like.

FIG. 6 is a block diagram illustrating a computer system 600 can be configured to provide the functionality described herein, in accordance with various embodiments of the concepts and technologies disclosed herein. In some embodiments, at least a portion of one or more of the aggregation server 170, the AR content server 186, the community data store 142, digital data store 140, and/or other components of the operating environment 100 illustrated and described herein can be configured as and/or can have an architecture similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network communication devices 610. In some embodiments, one or more elements of the operating environment 100 can include one or more instances of the processing unit 602 to support the execution and functionality of one or more operations discussed herein. For example, in some embodiments, one or more instances of the processing unit 602 can be implemented within one or more devices and/or components of the operating environment 100, such as but not limited to one or more of the UE 102, the original capture device 120, the digital data store 140, the community data store 142, the network 150, the aggregation server 170, the AR content server 186, and/or the UE 190. In some embodiments, one or more instances of the memory 604 can be implemented within one or more devices and/or components of the operating environment 100, such as but not limited to one or more of the UE 102, the original capture device 120, the digital data store 140, the community data store 142, the network 150, the aggregation server 170, the AR content server 186, and/or the UE 190. In various embodiments, one or more aspects of the aggregation server 170 can be included within, or otherwise provided by, the computer system 600.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in sequence and/or parallel in a single machine or in multiple machines. Furthermore, processors and/or processing units can be used to support virtual processing environments. Processors and processing units also can include state machines, application-specific integrated circuits ("ASICs"), combinations thereof, or the like. As used herein, the phrase "processing unit" may be referred to as a "processor." The processing unit 602 can include one or more central processing units ("CPUs") configured with one or more processing cores. The processing unit 602 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processing unit 602 can include one or more discrete GPUs. In some other embodiments, the processing unit 602 can include CPU and GPU components that are configured in accordance with a co-processing CPU/GPU computing model, wherein the sequential part of an application executes on the CPU and the computationally-intensive part is accelerated by the GPU. The processing unit 602 can include one or more system-on-chip ("SoC") components along with one or more other components including, for example, a memory, a communication component, or some combination thereof. In various embodiments, an instance of a processor (e.g., the processing unit 602) can be and/or can include one or more SNAPDRAGON SoCs, a cellular V2X ("C-V2X") chipset, and/or another architecture available from QUALCOMM of San Diego, Calif.; one or more TEGRA SoCs and/or another architecture available from NVIDIA of Santa Clara, Calif.; one or more HUMMINGBIRD SoCs and/or another architecture available from SAMSUNG of Seoul, South Korea; one or more Open Multimedia Application Platform ("OMAP") SoCs and/or another architecture available from TEXAS INSTRUMENTS of Dallas, Tex.; one or more customized versions of any of the above SoCs; and/or one or more proprietary SoCs and/or proprietary circuitry capable of supporting V2X communication processing. In various embodiments, an instance of a processor (e.g., the processing unit 602) can be and/or can include one or more hardware components architected in accordance with an ARM architecture, available for license from ARM HOLDINGS of Cambridge, United Kingdom. Alternatively (or additionally), an instance of a processor (e.g., the processing unit 602) can be or can include one or more hardware components architected in accordance with an x86 architecture, such as an architecture available from INTEL CORPORATION of Mountain View, Calif., and others. Those skilled in the technology will appreciate that the implementation of a processor (e.g., the processing unit 602) can utilize various computation architectures, and as such, a processor (e.g., the processing unit 602) should not be construed as being limited to any particular computation architecture or combination of computation architectures, including those explicitly disclosed herein. Because processors and/or processing units are generally known to one of ordinary skill, the processors and processing units disclosed and discussed herein will not be described in further detail herein.

The memory 604 communicates with the processing unit 602 via the system bus 612. In embodiments, one or more instances of memory provided by the UE 102, the original capture device 120, the digital data store 140, the community data store 142, the network 150, the aggregation server 170, the AR content server 186, and/or the UE 190 can be configured at least similar to the memory 604. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. In some embodiments, for example, the program modules 616 can include the CAA 172, the image recognition tool 206, and/or other computer-readable instructions. These and/or other programs can be embodied in computer-executable instructions that, when executed by the processing unit 602, can facilitate performance of one or more of the methods 300, 350, 370, and/or 400 described in detail above with respect to FIGS. 3A, 3B, 3C, and 4. According to some embodiments, the program modules 616 may be embodied in hardware, software, firmware, or any combination thereof. It should be understood that the memory 604 also can be configured to store one or more instance of information and data discussed with respect to FIGS. 1, 2, 3A, 3B, 3C, and 4, such as but not limited to the archived digital content 130, the digitization platform metadata 132, the existing metadata fields 134, the archived digital content 136, the original capture content 124, the native original metadata 122, the null pointer message 173, the null pointer exception 174, the surrogate metadata 175, the distinct metadata fields 176, the native original capture tags 177, the surrogate importable flag 168, the UE identifier 108, the stitched transition data 180, the historic view 182, the view 184A, the view 184B, the view 184N, and/or other data, such as any data discussed herein, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network communication devices 610 enable the computer system 600 to communicate with other networks or remote systems via a network, such as network 618. Examples of network communication devices 610 include, but are not limited to, a modem, a radio frequency ("RF") transceiver and/or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 618 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). In some embodiments, the network 618 may include one or more aspects of the network 500, discussed above. It should be understood that the examples provided are for illustration purposes only, and therefore should not be construed as limiting in any way.

Figure 7:
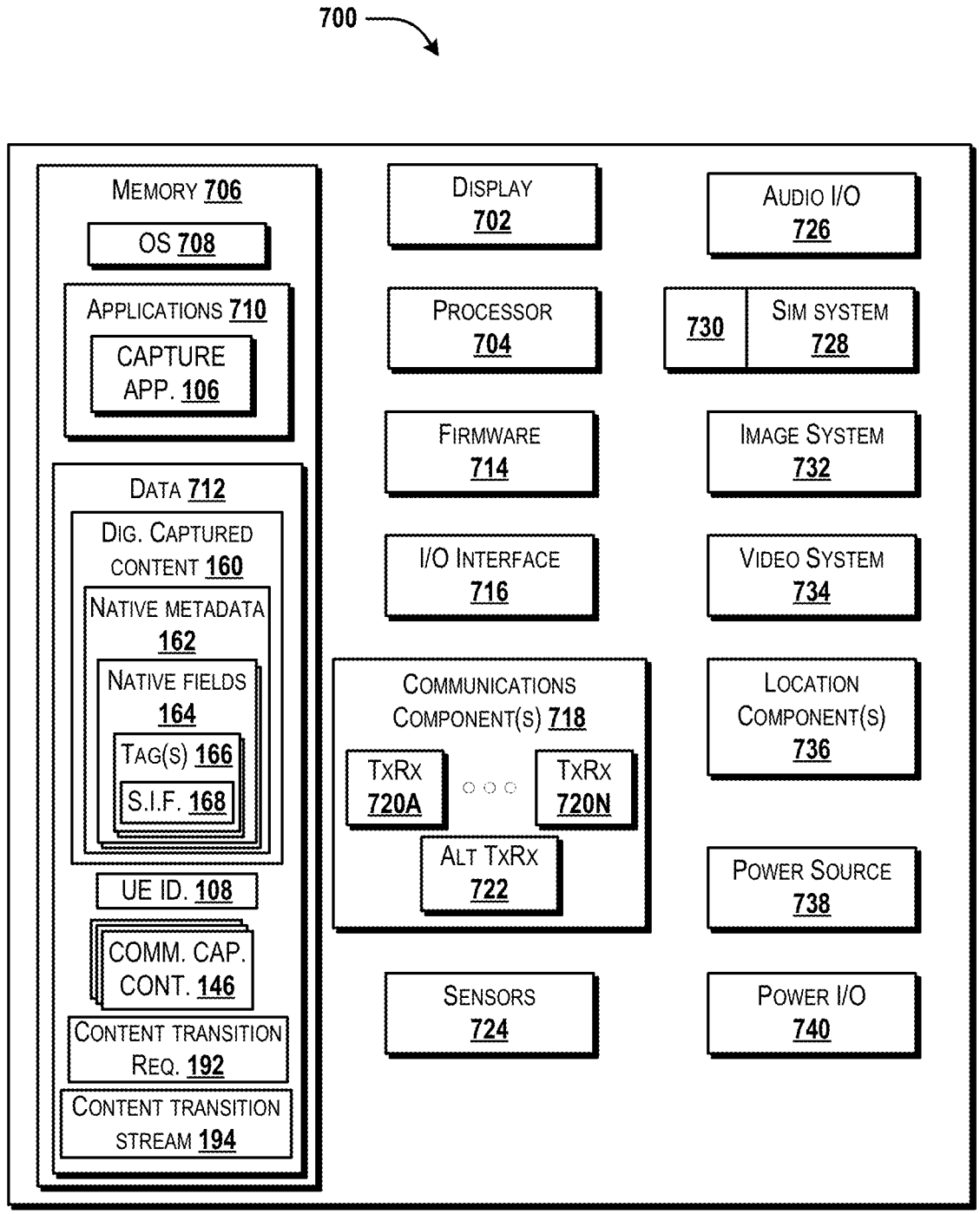
FIG. 7 is a diagram illustrating an example user equipment capable of implementing aspects of the concepts and technologies described herein according to embodiments of the present disclosure.

Turning now to FIG. 7, an illustrative user equipment 700 and components thereof will be described. In some embodiments, the UE 102, the UE 190, the community devices 144, the original capture device 120, and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). In various embodiments, aspects from one or more the UE 102, the UE 190, the community devices 144, and/or the original capture device 120 can be configured or otherwise implemented in the user equipment 700. As such, an instance of the UE 102 and/or the UE 190 may be configured according to one or more aspects of the user equipment 700 discussed herein. Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an audiovisual content filter, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as a display application that can present various communications, messages, and/or other computer-executable instructions stored in a memory 706, or the like. In some embodiments, the applications 710 also can include a UI application (not illustrated in FIG. 7) and/or software applications that can execute on the various user equipment to, for example, facilitate the digital capture of objects by an acquisition device of the image system 732, such as a camera.

One or more applications and/or computer readable instructions can interface with the operating system 708 to facilitate any of the operations discussed herein and functionality for presenting content and/or data stored at and/or received by the user equipment 700 and/or stored elsewhere. It is understood that one or more instances of the operating system 708 may be included and operate within one or more systems discussed with respect to the operating environment 100, such as but not limited to the aggregation server 170 and/or the AR content server 186. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

An application can be executed by the processor 704 to aid a user in presenting content (e.g., the digitally captured content 160, the community captured content 146, the archived digital content 130, the content transition stream 194, and/or any other content message, and/or information discussed herein), presenting a various communications, providing input or other information about the user equipment 700, presenting an identifier, configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. In some embodiments, the applications 710 can include the capture application 106. According to various embodiments, the data 712 can include, for example, instances of the digitally captured content 160, the native metadata 162, the native fields 164, the tags 166, the surrogate importable flag 168, the UE identifier 108, the community captured content 146, the content transition request 192, the content transition stream 194, any other elements discussed with respect to FIGS. 1, 2, 3A, 3B, 3C, 4, 5, and/or 6, presence applications, content capture applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any system and/or device discussed in FIG. 1. The I/O interface 716 can be configured to support the input/output of data such as a message, communication, command, and/or instruction, and/or any other information or elements discussed with respect to FIGS. 1, 2, 3, and 4, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks (e.g., the network 150 and/or the network 500) and/or a network device (e.g., a network access point, the aggregation server 170, the community data store 142, the digital data store 140, etc.) described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, LTE, LTE Advanced, 5G NR, and greater generation technology standards. Moreover, the communications component 718 may facilitate communications over various channel access methods (which may or may not be used by the aforementioned standards) including, but not limited to, TDMA, FDMA, W-CDMA, OFDMA, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like. In some embodiments, the communications component 718 can support one or more communication modes, such as a direct transmission mode over a PC5 interface and/or the network transmission mode over a Uu interface.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 maybe included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to surrogate metadata aggregation for dynamic content assembly have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, acts, or mediums described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A system comprising:
   a processor; and
   a memory that stores computer-executable instructions that, in response to execution by the processor, cause the processor to perform operations comprising:
   obtaining a first visual content from a digital data store, wherein the first visual content is configured to digitally represent a first scene,
   performing image recognition on the first visual content so as to identify a second visual content that is digitally configured to represent a second scene, wherein identification of the second visual content is based on the second visual content having an amount of image features that are shared with the first visual content, and wherein the amount of image features exceeds a shared feature threshold,
   determining that native original metadata cannot be obtained for the first visual content, wherein the native original metadata includes information about the first scene digitally represented by the first visual content, and
   generating surrogate metadata for the first visual content based on metadata obtained from the second visual content.

2. The system of claim 1, wherein the operations further comprise embedding the surrogate metadata within the first visual content, wherein the surrogate metadata is embedded without populating existing metadata fields provided by the first visual content.

3. The system of claim 1, wherein generating the surrogate metadata comprises:
   identifying, for the first visual content, tags within the metadata from the second visual content;
   determining which of the tags within the metadata are marked as surrogate importable; and
   assembling the surrogate metadata based on the tags that are marked as surrogate importable.

4. The system of claim 1, wherein determining that the native original metadata cannot be obtained from the first visual content comprises:
   dereferencing the first visual content to detect for the native original metadata; and
   determining that the dereferencing yields a null pointer exception, wherein the null pointer exception results from the first visual content not having fields to store the native original metadata.

5. The system of claim 1, wherein the operations further comprise:
   receiving a content transition request associated with the second scene; and
   identifying the first visual content and the second visual content based on the surrogate metadata.

6. The system of claim 5, wherein the operations further comprise:
   generating a content transition stream that includes the first visual content and the second visual content, wherein the content transition stream presents a transition between the first scene and the second scene; and
   providing the content transition stream to a requesting device.

7. A method comprising:
   obtaining, by a network server executing a processor, a first visual content from a digital data store, wherein the first visual content is configured to digitally represent a first scene;
   performing, by the network server, image recognition on the first visual content so as to identify a second visual content that is digitally configured to represent a second scene, wherein identification of the second visual content is based on the second visual content having an amount of image features that are shared with the first visual content, and wherein the amount of image features exceeds a shared feature threshold;
   determining, by the network server, that native original metadata cannot be obtained for the first visual content, wherein the native original metadata includes information about the first scene digitally represented by the first visual content; and
   generating, by the network server, surrogate metadata for the first visual content based on metadata obtained from the second visual content.

8. The method of claim 7, further comprising embedding, by the network server, the surrogate metadata within the first visual content, wherein the surrogate metadata is embedded without populating existing metadata fields provided by the first visual content.

9. The method of claim 7, wherein generating the surrogate metadata comprises:
   identifying, by the network server, for the first visual content, tags within the metadata from the second visual content;
   determining, by the network server, which of the tags within the metadata are marked as surrogate importable; and
   assembling, by the network server, the surrogate metadata based on the tags that are marked as surrogate importable.

10. The method of claim 7, wherein determining that the native original metadata cannot be obtained from the first visual content comprises:
    dereferencing, by the network server, the first visual content to detect for the native original metadata; and
    determining, by the network server, that the dereferencing yields a null pointer exception, wherein the null pointer exception results from the first visual content not having fields to store the native original metadata.

11. The method of claim 7, further comprising:
    receiving, by the network server, a content transition request associated with the second scene; and identifying, by the network server, the first visual content and the second visual content based on the surrogate metadata.

12. The method of claim 11, further comprising:

generating, by the network server, a content transition stream that includes the first visual content and the second visual content, wherein the content transition stream presents a transition between the first scene and the second scene; and providing, by the network server, the content transition stream to a requesting device.

13. A computer storage medium having computer-executable instructions stored thereon that, in response to execution by a processor, causes the processor to perform operations comprising:

obtaining a first visual content from a digital data store, wherein the first visual content is configured to digitally represent a first scene;

performing image recognition on the first visual content so as to identify a second visual content that is digitally configured to represent a second scene, wherein identification of the second visual content is based on the second visual content having an amount of image features that are shared with the first visual content, and wherein the amount of image features exceeds a shared feature threshold;

determining that native original metadata cannot be obtained for the first visual content, wherein the native original metadata includes information about the first scene digitally represented by the first visual content; and generating surrogate metadata for the first visual content based on metadata obtained from the second visual content.

14. The computer storage medium of claim 13, wherein the operations further comprise embedding the surrogate metadata within the first visual content, wherein the surrogate metadata is embedded without populating existing metadata fields provided by the first visual content.

15. The computer storage medium of claim 13, wherein determining that the native original metadata cannot be obtained from the first visual content comprises:

dereferencing the first visual content to detect for the native original metadata; and determining that the dereferencing yields a null pointer exception, wherein the null pointer exception results from the first visual content not having fields to store the native original metadata.

16. The computer storage medium of claim 13, wherein the operations further comprise:

receiving a content transition request associated with the second scene; and identifying the first visual content and the second visual content based on the surrogate metadata.

17. The computer storage medium of claim 16, wherein the operations further comprise:

generating a content transition stream that includes the first visual content and the second visual content, wherein the content transition stream presents a transition between the first scene and the second scene; and providing the content transition stream to a requesting device.

* * * * *